United States Patent
Zhou et al.

(10) Patent No.: US 12,074,680 B2
(45) Date of Patent: Aug. 27, 2024

(54) TRANSMISSION RECEIVE POINT (TRP)-SPECIFIC BEAM FAILURE RECOVERY REQUEST (BFRQ)

(71) Applicant: QUALCOMM Incorporated, San Diego, CA (US)

(72) Inventors: Yan Zhou, San Diego, CA (US); Kiran Venugopal, Raritan, NJ (US); Mostafa Khoshnevisan, San Diego, CA (US); Tao Luo, San Diego, CA (US); Xiaoxia Zhang, San Diego, CA (US)

(*) Notice: Subject to any disclaimer, the term of this patent is extended or adjusted under 35 U.S.C. 154(b) by 264 days.

(21) Appl. No.: 17/483,361

(22) Filed: Sep. 23, 2021

(65) Prior Publication Data

US 2022/0103234 A1    Mar. 31, 2022

Related U.S. Application Data

(60) Provisional application No. 63/083,859, filed on Sep. 25, 2020, provisional application No. 63/083,856, filed on Sep. 25, 2020.

(51) Int. Cl.
| | |
|---|---|
| *H04B 7/08* | (2006.01) |
| *H04W 72/044* | (2023.01) |
| *H04W 72/21* | (2023.01) |
| *H04W 76/19* | (2018.01) |

(52) U.S. Cl.
CPC ......... *H04B 7/088* (2013.01); *H04W 72/046* (2013.01); *H04W 72/21* (2023.01); *H04W 76/19* (2018.02)

(58) Field of Classification Search
CPC .... H04W 72/21; H04W 72/046; H04W 76/19
See application file for complete search history.

(56) References Cited

U.S. PATENT DOCUMENTS

| | | | | |
|---|---|---|---|---|
| 2019/0230545 A1* | 7/2019 | Liou | ...................... | H04W 24/10 |
| 2020/0350972 A1* | 11/2020 | Yi | .............................. | H04L 1/12 |
| 2022/0295589 A1* | 9/2022 | Tsai | ...................... | H04B 17/309 |
| 2023/0006727 A1* | 1/2023 | Jang | ........................ | H04L 5/0051 |

* cited by examiner

*Primary Examiner* — Basil Ma

(57) ABSTRACT

Certain aspects of the present disclosure provide enhancements to enable per transmission reception point (per-TRP or per beam group)-based beam failure recovery, and more particularly, techniques for TRP-specific beam failure recovery request (BFRQ). A method that may be performed by a user equipment (UE) includes communicating using beams associated with at least two beam groups, each associate with one of the TRPs, detecting a beam failure in a first one of the beam groups, and transmitting an indication of a BFRQ specific to a beam group in which the beam failure was detected.

17 Claims, 19 Drawing Sheets

Scell BFR MAC CE with the highest *ServCellIndex* of this MAC entity's Scell configured with BFD is equal to or larger than 8

```
1400

CandidateBeamRS-r16 ::=              SEQUENCE {
    candidateBeamConfig-r16              CHOICE {
        ssb-r16                              SSB-Index,
        csi-RS-r16                           NZP-CSI-RS-ResourceId
    },
    servingCellId                        ServCellIndex
OPTIONAL   -- Need R
    TRPId                                TRPIndex
}
```

FIG. 14

TRANSMISSION RECEIVE POINT (TRP)-SPECIFIC BEAM FAILURE RECOVERY REQUEST (BFRQ)

CROSS-REFERENCE TO RELATED APPLICATIONS

This application claims benefit to U.S. Provisional Patent Application Ser. No. 63/083,856, entitled "TRP Specific RACH Based BFRQ," filed Sep. 25, 2020, and U.S. Provisional Patent Application Ser. No. 63/083,859, entitled "TRP Specific Candidate Beam and UCI Based BFRQ," filed Sep. 25, 2020, both of which are assigned to the assignee hereof, and the contents of both of which are hereby incorporated by reference in their entirety.

BACKGROUND

Field of the Disclosure

Aspects of the present disclosure relate to wireless communications, and more particularly, to beam failure recovery request (BFRQ).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

Certain aspects of the subject matter described in this disclosure can be implemented in a method for wireless communication by a UE. The method generally includes communicating using beams associated with at least two beam groups; and transmitting, in uplink control information (UCI) on a physical uplink control channel (PUCCH), an indication of a beam failure recovery request (BFRQ) specific to a first beam group of the at least two beam groups associated with a beam failure.

Certain aspects of the subject matter described in this disclosure can be implemented in a method for wireless communication by a network entity. The method generally includes receiving, from a user equipment (UE), in uplink control information (UCI) on a physical uplink control channel (PUCCH), an indication of a beam failure recovery request (BFRQ) specific to a beam group in which a beam failure was detected; and participating in beam failure recovery (BFR) for the UE based on the BFRQ.

Aspects of the present disclosure provide means for, apparatus, processors, and computer-readable mediums for performing the methods described herein.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIG. 14 illustrates an example candidate beam configuration and reporting format, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
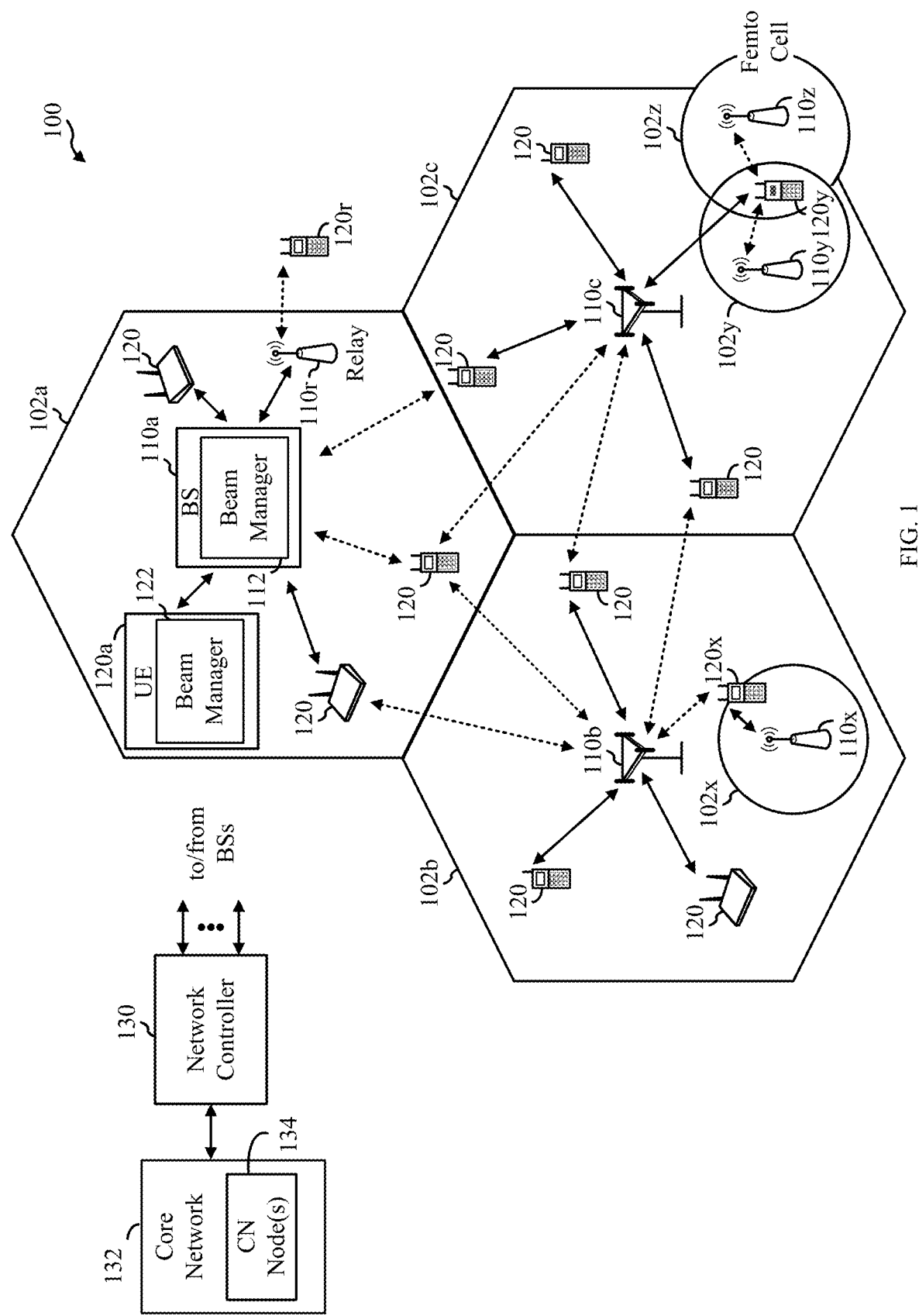
FIG. 1 is a block diagram conceptually illustrating an example telecommunications system, in accordance with certain aspects of the present disclosure.

Aspects of the present disclosure provide apparatus, methods, processing systems, and computer readable mediums for techniques for enabling per-transmission reception point (per-TRP) or per beam group based beam failure recovery (BFR) procedures. In certain aspects, a TRP may itself be a base station (BS), or each TRP may be a radio head (RH) for a base station, where a BS may have multiple RHs. In the absence of per-TRP BFR, beam failure detection (BFD) and candidate beam detection (CBD) may not be triggered until all beams in that component carrier (CC) become weak. With per-TRP BFR, when beams for a given TRP become weak, beam recovery procedures can be performed, and a suitable (e.g., best, above a threshold quality metric, etc.) beam corresponding to that TRP can be identified without having to wait for the beams of the other TRPs to also become weak, and thus reliability and communications efficiency can be enhanced.

Accordingly, aspects of the present disclosure provide enhancements that may help enable per TRP based BFR (effectively beam group based BFR), and more particularly, techniques for the configuration of physical uplink control channel (PUCCH) BFR for TRP (or beam group) specific BFR. While the techniques may involve beam groups, they may be considered TRP-specific. This is because the concept of TRPs may generally be kept transparent to a user equipment (UE). In other words, the UE may only be aware of a beam group (for a set of beams) corresponding to a TRP (but may be unaware of the actual corresponding TRP identifier (ID)).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G new radio (NR)) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. Multiple-input multiple-output (MIMO) transmissions with precoding may also be supported. MIMO configurations in a downlink may support up to 8 transmit antennas with multi-layer downlink transmissions up to 8 streams and up to 2 streams per UE. Multi-layer transmissions with up to 2 streams per UE may be supported. Aggregation of multiple cells may be supported with up to 8 serving cells.

Example Wireless Communications System

FIG. 1 illustrates an example wireless communication network 100 in which aspects of the present disclosure may be performed. For example, the wireless communication network 100 may include a UE, such as UE 120a (with a beam manager 122) that is configured to perform operations 1200 of FIG. 12. Similarly, wireless communication network 100 may include a network entity, such as base station (BS) 110a (with a beam manager 112) that is configured to perform operations 1300 of FIG. 13.

As shown in FIG. 1, wireless communication network 100 may be in communication with a core network 132. Core network 132 may be in communication with one or more BSs 110a-z (each also individually referred to herein as BS 110 or collectively as BSs 110) and/or UEs 120a-y (each also individually referred to herein as UE 120 or collectively as UEs 120) in wireless communication network 100 via one or more interfaces.

A BS 110 may provide communication coverage for a particular geographic area, sometimes referred to as a "cell", which may be stationary or may move according to the location of a mobile BS 110. In some examples, BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, BSs 110a, 110b, and 110c may be macro BSs for the macro cells 102a, 102b and 102c, respectively. BS 110x may be a pico BS for a pico cell 102x. BSs 110y and 110z may be femto BSs for the femto cells 102y and 102z, respectively. A BS 110 may support one or multiple cells.

BSs 110 communicate with UEs 120 in wireless communication network 100. UEs 120 (e.g., 120x, 120y, etc.) may be dispersed throughout wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, network controller 130 may be in communication with core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
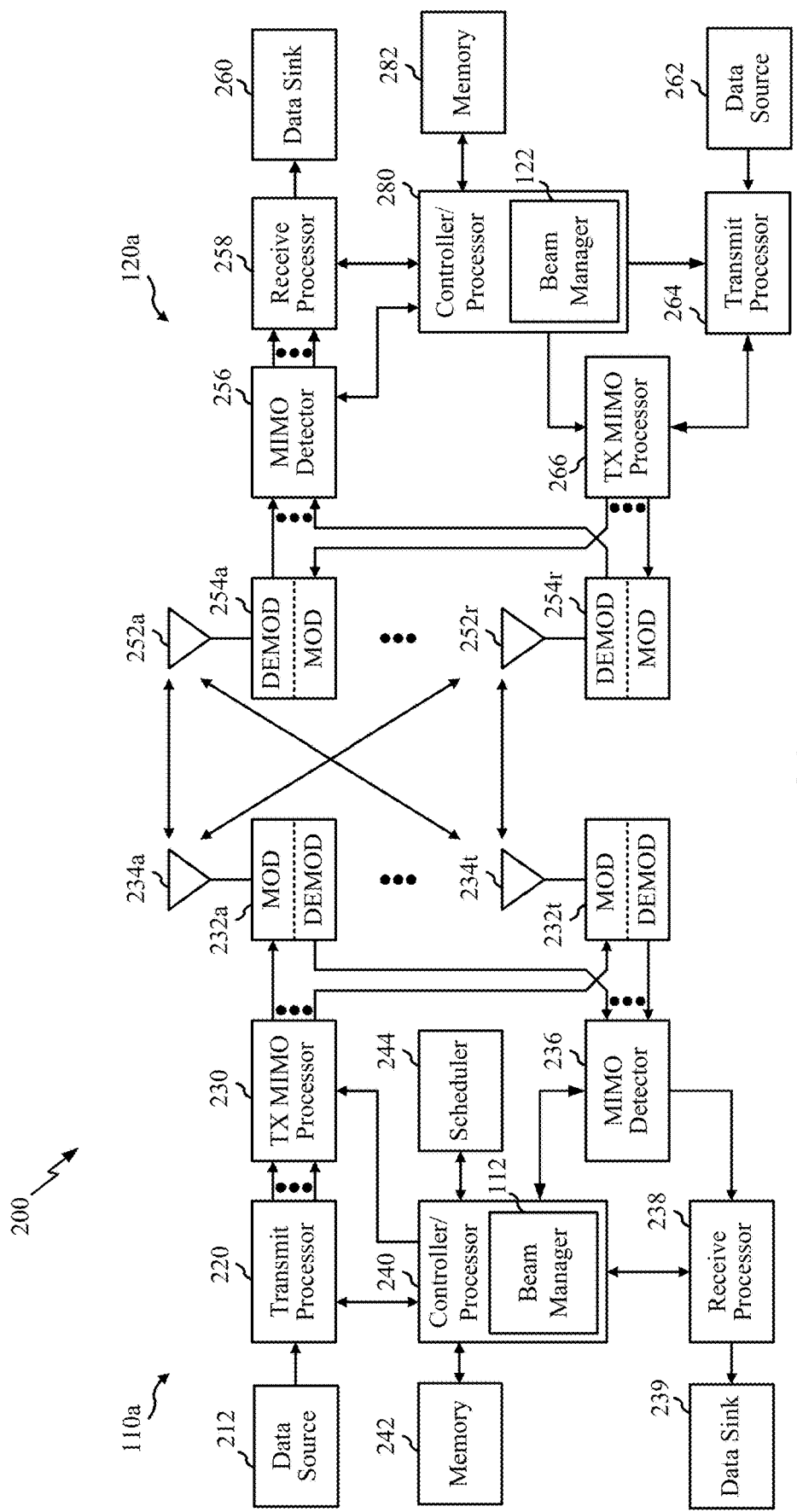
FIG. 2 illustrates example components of a network entity (e.g., base station (BS)) and a user equipment (UE), in accordance with certain aspects of the present disclosure.

FIG. 2 illustrates example components of BS 110a and UE 120a (e.g., in wireless communication network 100 of FIG. 1), which may be used to implement certain aspects of the present disclosure.

At BS 110a, a transmit processor 220 may receive data from a data source 212 and control information from a controller/processor 240. The control information may be for the physical broadcast channel (PBCH), physical control format indicator channel (PCFICH), physical hybrid automatic repeat request (HARD) indicator channel (PHICH), physical downlink control channel (PDCCH), group common PDCCH (GC PDCCH), etc. The data may be for the physical downlink shared channel (PDSCH), etc. A medium access control (MAC)-control element (CE) (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-

232t may process a respective output symbol stream (e.g., for orthogonal frequency division multiplexing (OFDM), etc.) to obtain an output sample stream. Each modulator may further process (e.g., convert to analog, amplify, filter, and upconvert) the output sample stream to obtain a downlink (DL) signal. DL signals from the modulators in transceivers 232a-232t may be transmitted via the antennas 234a-234t, respectively.

At UE 120a, antennas 252a-252r may receive the DL signals from BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for UE 120a to a data sink 260, and provide decoded control information to a controller/processor 280.

On the uplink (UL), at UE 120a, a transmit processor 264 may receive and process data (e.g., for the PUSCH) from a data source 262 and control information (e.g., for the physical uplink control channel (PUCCH) from controller/processor 280. Transmit processor 264 may also generate reference symbols for a reference signal (RS) (e.g., for the sounding reference signal (SRS)). The symbols from transmit processor 264 may be precoded by a TX MIMO processor 266 if applicable, further processed by the modulators in transceivers 254a-254r (e.g., for single-carrier frequency division multiplexing (SC-FDM), etc.), and transmitted to BS 110a. At BS 110a, the UL signals from UE 120a may be received by antennas 234, processed by demodulators in transceivers 232a-232t, detected by a MIMO detector 236 if applicable, and further processed by a receive processor 238 to obtain decoded data and control information sent by UE 120a. Receive processor 238 may provide the decoded data to a data sink 239 and the decoded control information to the controller/processor 240.

Memories 242 and 282 may store data and program codes for BS 110a and UE 120a, respectively. A scheduler 244 may schedule UEs 120 for data transmission on the DL and/or UL.

Antennas 252, processors 266, 258, 264, and/or controller/processor 280 of UE 120a and/or antennas 234, processors 220, 230, 238, and/or controller/processor 240 of BS 110a may be used to perform the various techniques and methods described herein. For example, as shown in FIG. 2, the controller/processor 240 of the BS 110a has a beam manager 112 that performs TRP-specific (or beam-group-specific) BFRQ, according to certain aspects described herein. Similarly, as shown in FIG. 2, the controller/processor 280 of the UE 120a has a beam manager 122 that performs TRP-specific (or beam-group-specific) BFRQ, according to certain aspects described herein. Although shown at the controller/processor, other components of UE 120a and BS 110a may be used to perform the operations described herein.

NR may utilize OFDM with a cyclic prefix (CP) on the UL and DL. NR may support half-duplex operation using time division duplexing (TDD). OFDM and SC-FDM partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 kilohertz (KHz) and other SCS may be defined with respect to the base SCS (e.g., 30 kHz, 60 kHz, 120 kHz, 240 kHz, etc.).

Figure 3:
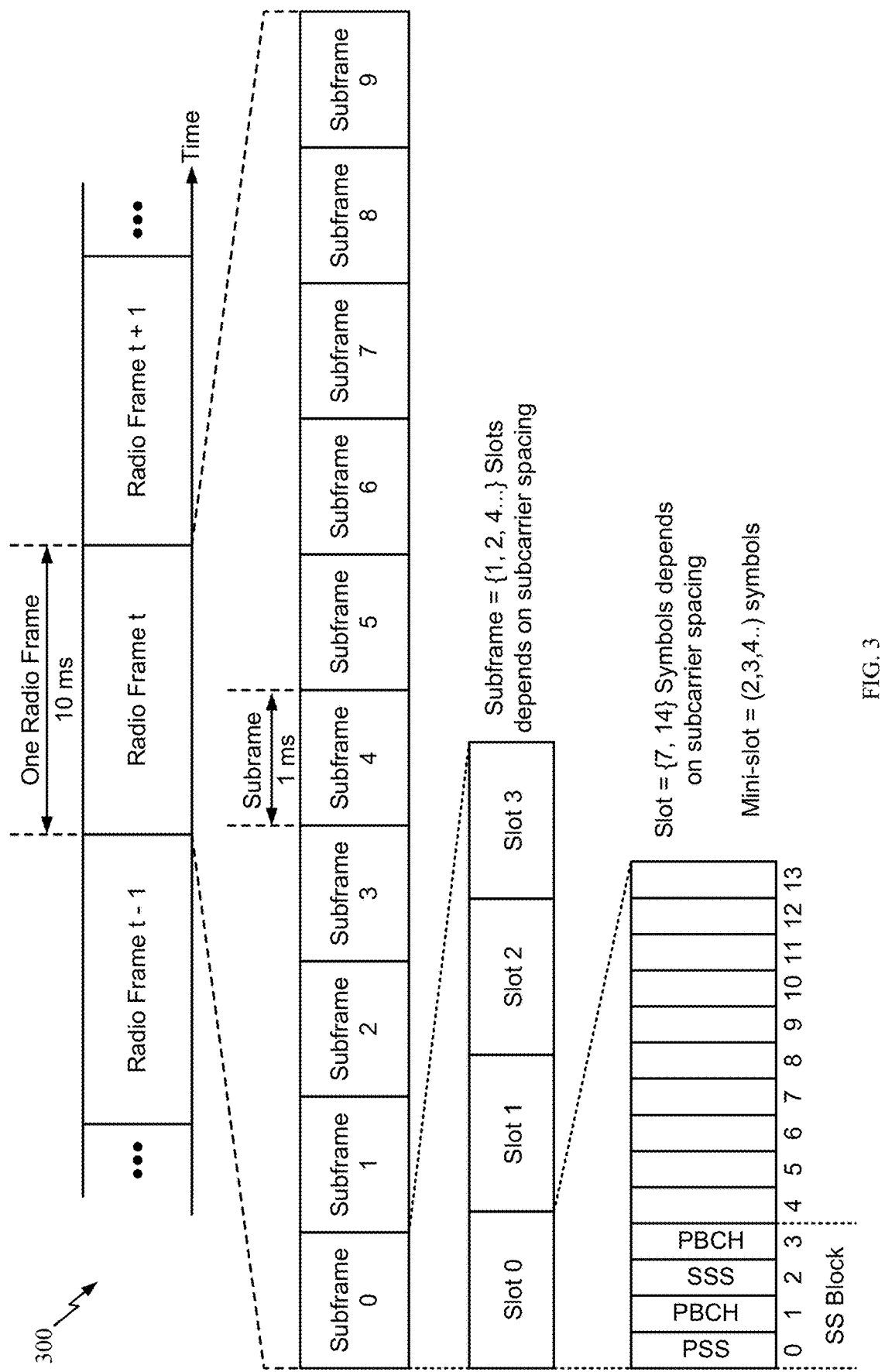
FIG. 3 is an example frame format for new radio (NR), in accordance with certain aspects of the present disclosure.

FIG. 3 is a diagram showing an example of a frame format 300 for NR, in accordance with certain aspects of the present disclosure. The transmission timeline for each of the DL and UL may be partitioned into units of radio frames. Each radio frame may have a predetermined duration (e.g., 10 milliseconds (ms)) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A sub-slot structure may refer to a transmit time interval (TTI) having a duration less than a slot (e.g., 2, 3, or 4 symbols). Each symbol in a slot may be configured for a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, and the SSS may provide the CP length and frame timing. The PSS and SSS may provide the cell identity. The PBCH carries some basic system information, such as DL system bandwidth, timing information within radio frame, synchronization signal (SS) burst set periodicity, system frame number, etc. The SSBs may be organized into SS bursts to support beam sweeping. Further system information such as, remaining minimum system information (RMSI), system information blocks (SIBs), other system information (OSI) can be transmitted on a PDSCH in certain subframes. The SSB can be transmitted up to sixty-four times, for example, with up to sixty-four different beam directions for millimeter wave (mmW). The multiple transmissions of the SSB are referred to as an SS burst set. SSBs in an SS burst set may be transmitted in the same frequency region, while SSBs in different SS bursts sets can be transmitted at different frequency regions.

Figure 4:
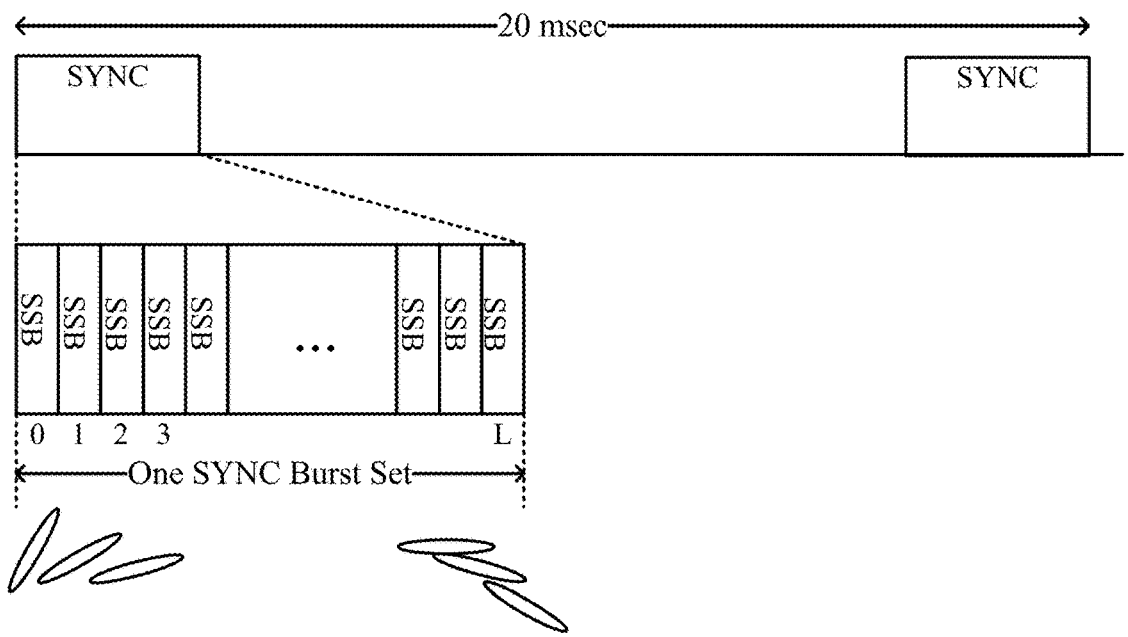
FIG. 4 illustrates how different synchronization signal blocks (SSBs) may be sent using different beams, in accordance with certain aspects of the present disclosure.

FIG. 4 illustrates how different SSBs may be sent using different beams, in accordance with certain aspects of the present disclosure. As shown in FIG. 4, the SSBs may be organized into SS burst sets to support beam sweeping. Each SSB within a burst set may be transmitted using a different beam, which may help a UE quickly acquire both transmit (TX) and receive (RX) beams (particular for mmW applications). A physical cell identity (PCI) may still be decoded from the PSS and SSS of the SSB.

Certain deployment scenarios may include one or both NR deployment options. Some may be configured for a non-standalone (NSA) and/or a standalone (SA) option. A standalone cell may need to broadcast both SSB and remaining minimum system information (RMSI), for example, with SIB1 and SIB2. A non-standalone cell may only need to broadcast SSB, without broadcasting RMSI. In a single carrier in NR, multiple SSBs may be sent in different frequencies, and may include the different types of SSBs.

Example Control Resource Sets (CORESETs)

A control resource set (CORESET) for an orthogonal frequency division multiple access (OFDMA) system (e.g., a communications system transmitting physical downlink control channels (PDCCHs) using OFDMA waveforms) may comprise one or more control resource (e.g., time and frequency resources) sets, configured for conveying PDCCH, within the system bandwidth (e.g., a specific area on the New Radio (NR) Downlink Resource Grid) and a set of parameters used to carry PDCCH/downlink control information (DCI). For example, a CORESET may be similar in area to an LTE PDCCH area (e.g., the first 1, 2, 3, 4 orthogonal frequency division multiplexed (OFDM) symbols in a subframe).

Within each CORESET, one or more search spaces (e.g., common search space (CSS), UE-specific search space (USS), etc.) may be defined for a given user equipment (UE). Search spaces are generally areas or portions where a communication device (e.g., a UE) may look for control information.

According to aspects of the present disclosure, a CORESET is a set of time and frequency domain resources, defined in units of resource element groups (REGs). Each REG may comprise a fixed number (e.g., twelve) tones/subcarriers in one symbol period (e.g., a symbol period of a slot), where one tone in one symbol period is referred to as a resource element (RE). A fixed number of REGs, such as six, may be included in a control channel element (CCE). Sets of CCEs may be used to transmit NR-PDCCHs, with different numbers of CCEs in the sets used to transmit NR-PDCCHs using differing aggregation levels. Multiple sets of CCEs may be defined as search spaces for UEs, and thus a NodeB or other base station (BS) may transmit an NR-PDCCH to a UE by transmitting the NR-PDCCH in a set of CCEs that is defined as a decoding candidate within a search space for the UE. The UE may receive the NR-PDCCH by searching in search spaces for the UE and decoding the NR-PDCCH transmitted by the NodeB.

As noted above, different aggregation levels may be used to transmit sets of CCEs. Aggregation levels may be generally be defined as the number of CCEs that consist of a PDCCH candidate and may include aggregation levels 1, 2, 4, 8, and 18, which may be configured by a radio resource control (RRC) configuration of a search space set (SS-set). A CORESET may be linked with the SS-set within the RRC configuration. For each aggregation level, the number of PDCCH candidates may be RRC configurable.

Operating characteristics of a NodeB or other BS in an NR communications system may be dependent on a frequency range (FR) in which the system operates. A frequency range may comprise one or more operating bands (e.g., "n1" band, "n2" band, "n7" band, and "n41" band), and a communications system (e.g., one or more NodeBs and UEs) may operate in one or more operating bands. Frequency ranges and operating bands are described in more detail in "Base Station (BS) radio transmission and reception" TS38.104 (Release 15), which is available from the 3GPP website.

As described above, a CORESET is a set of time and frequency domain resources. The CORESET can be configured for conveying PDCCH within system bandwidth. A UE may determine a CORESET and monitor the CORESET for control channels. During initial access, a UE may identify an initial CORESET (CORESET #0) configuration from a field (e.g., pdcchConfigSIB1) in a maser information block (MIB). This initial CORESET may then be used to configure the UE (e.g., with other CORESETs and/or bandwidth parts (BWPs) via dedicated (UE-specific) signaling. When the UE detects a control channel in the CORESET, the UE attempts to decode the control channel and communicates with the transmitting BS (e.g., the transmitting cell) according to the control data provided in the control channel (e.g., transmitted via the CORESET).

In some cases, CORESET #0 may include different numbers of resource blocks (RBs). For example, in some cases, CORESET #0 may include one of 24, 48, or 96 RBs. For other CORESETSs, a 45-bit bitmap may be used to configure available RB-groups, where each bit in the bitmap is with respect to 6-RBs within a BWP and a most significant bit corresponds to the first RB-group in the BWP.

According to aspects of the present disclosure, when a UE is connected to a cell (or BS), the UE may receive a master information block (MIB). The MIB can be in a synchronization signal and physical broadcast channel (SS/PBCH) block (e.g., in the PBCH of the SS/PBCH block) on a synchronization raster (sync raster). In some scenarios, the sync raster may correspond to a synchronization signal block (SSB). From the frequency of the sync raster, the UE may determine an operating band of the cell. Based on a cell's operation band, the UE may determine a minimum channel bandwidth and a subcarrier spacing (SC S) of the channel. The UE may then determine an index from the MIB (e.g., four bits in the MIB, conveying an index in a range 0-15).

Given this index, the UE may look up or locate a CORESET configuration (this initial CORESET configured via the MIB is generally referred to as CORESET #0). This may be accomplished from one or more tables of CORESET configurations. These configurations (including single table scenarios) may include various subsets of indices indicating valid CORESET configurations for various combinations of minimum channel bandwidth and subcarrier spacing (SCS). In some arrangements, each combination of minimum channel bandwidth and SCS may be mapped to a subset of indices in the table.

Alternatively or additionally, the UE may select a search space CORESET configuration table from several tables of CORESET configurations. These configurations can be based on a minimum channel bandwidth and SCS. The UE may then look up a CORESET configuration (e.g., a Type0-PDCCH search space CORESET configuration) from the selected table, based on the index. After determining the CORESET configuration (e.g., from the single table or the selected table), the UE may then determine the CORESET to be monitored (as mentioned above) based on the location (in time and frequency) of the SS/PBCH block and the CORESET configuration.

Figure 5:
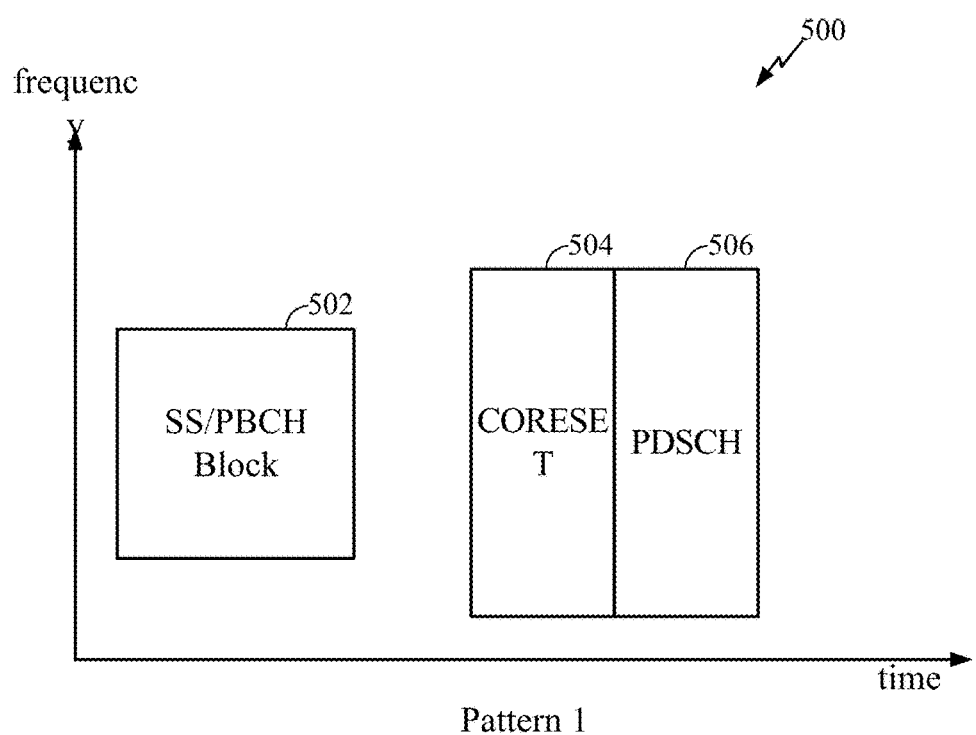
FIG. 5 illustrates an exemplary transmission resource mapping, in accordance with certain aspects of the present disclosure.

FIG. 5 shows an exemplary transmission resource mapping 500, in accordance with certain aspects of the present disclosure. In the exemplary mapping, a BS (e.g., such as BS 110a shown in FIG. 1 and FIG. 2) transmits an SS/PBCH block 502. SS/PBCH block 502 includes an MIB conveying an index to a table that relates the time and frequency resources of CORESET 504 to the time and frequency resources of SS/PBCH block 502.

The BS may also transmit control signaling. In some scenarios, the BS may also transmit a PDCCH to a UE (e.g., such as UE 120a shown in FIG. 1 and FIG. 2) in the (time/frequency resources of the) CORESET. The PDCCH may schedule a PDSCH 506. The BS then transmits the PDSCH to the UE. The UE may receive the MIB in SS/PBCH block 502, determine the index, look up a CORE-SET configuration based on the index, and determine the CORESET from the CORESET configuration and SS/PBCH block 502. The UE may then monitor the CORESET, decode the PDCCH in the CORESET, and receive PDSCH 506 that was allocated by the PDCCH.

Different CORESET configurations may have different parameters that define a corresponding CORESET. For example, each configuration may indicate a number of resource blocks (RBs) (e.g., 24, 48, or 96), a number of symbols (e.g., 1-3), as well as an offset (e.g., 0-38 RBs) that indicates a location in frequency.

Further, REG bundles may be used to convey CORE-SETs. REGs in an REG bundle may be contiguous in a frequency and/or a time domain. In certain cases, the time domain may be prioritized before the frequency domain. REG bundle sizes may include, for example: 2, 3, or 6 for interleaved mapping and 6 for non-interleaved mapping.

As noted above, sets of CCEs may be used to transmit NR-PDCCHs, with different numbers of CCEs in the sets used to transmit the NR-PDCCHs using differing aggregation levels.

Example Multiple Transmission Reception Point (Multi-TRP) Beam Failure Recovery (BFR)

As mentioned above, aspects of the present disclosure relate generally to beam failure detection and recovery. In some systems, narrow-beam transmission and reception is useful for improving the link budget at millimeter-wave (mmW) frequencies but may be susceptible to beam failure. In mmW, directional beamforming is used between a user equipment (UE) and a base station (BS), and the UE and the BS communicate via a beam pair link (BPL). Though certain aspects may be described with respect to mmW frequency, such aspects may also be applicable to other suitable frequencies.

A beam failure generally refers to a scenario in which the quality of a beam falls below a threshold, which may lead to radio link failure (RLF). New Radio (NR) supports a lower layer signaling to recover from beam failure, referred to as beam failure recovery (BFR). For example, instead of initiating a cell reselection to a new cell when a beam quality becomes too low, a beam pair reselection within the same cell may be performed, which may use less signaling and overhead than a cell reselection.

Beam failure may be detected by monitoring a beam failure detection (BFD) reference signal (RS) and assessing if a beam failure trigger condition has been met. Generally, a UE monitors the BFD RS from a primary cell (Pcell), a primary secondary cell (PScell), or a secondary cell (Scell) (e.g., a coverage area of a BS). In some examples, BFD is triggered if an estimated block error rate (BLER) of RSs associated with a configured control resource set (CORE-SET) is above a threshold (e.g., 10%). In some examples, the UE detects beam failure when the reference signal receive power (RSRP) or other signal quality measurement (based on the BFD RS) of a BPL fails to satisfy (e.g., is below) a threshold. Once beam failure is detected, the UE initiates BFR.

A multiple transmission reception point (multi-TRP) operation may increase system capacity, as well as reliability. Accordingly for BFR, in some examples, the UE may be configured to provide per-TRP BFR, which enables separate BFD and separate candidate beam detection (CBD) (e.g., selection of a new beam that can potentially be used in subsequent communications between a UE and a network entity) for the beams corresponding to a TRP in a component carrier (CC) (e.g., a frequency resource on which communications can be performed alone or in conjunction with other frequency resources in a wireless communication system) that is configured with two values of CORESET pool indices. In the absence of per-TRP BFR, BFD and CBD may not be triggered until all beams in that CC become weak. With per-TRP BFR, when beams for a given TRP become weak, beam recovery procedures can be performed, and a suitable (e.g., best, having a quality metric above a threshold, etc.) beam corresponding to that TRP can be identified without having to wait for the beams of the other TRPs to also become weak, and thus reliability and communications efficiency can be enhanced.

Figure 6:
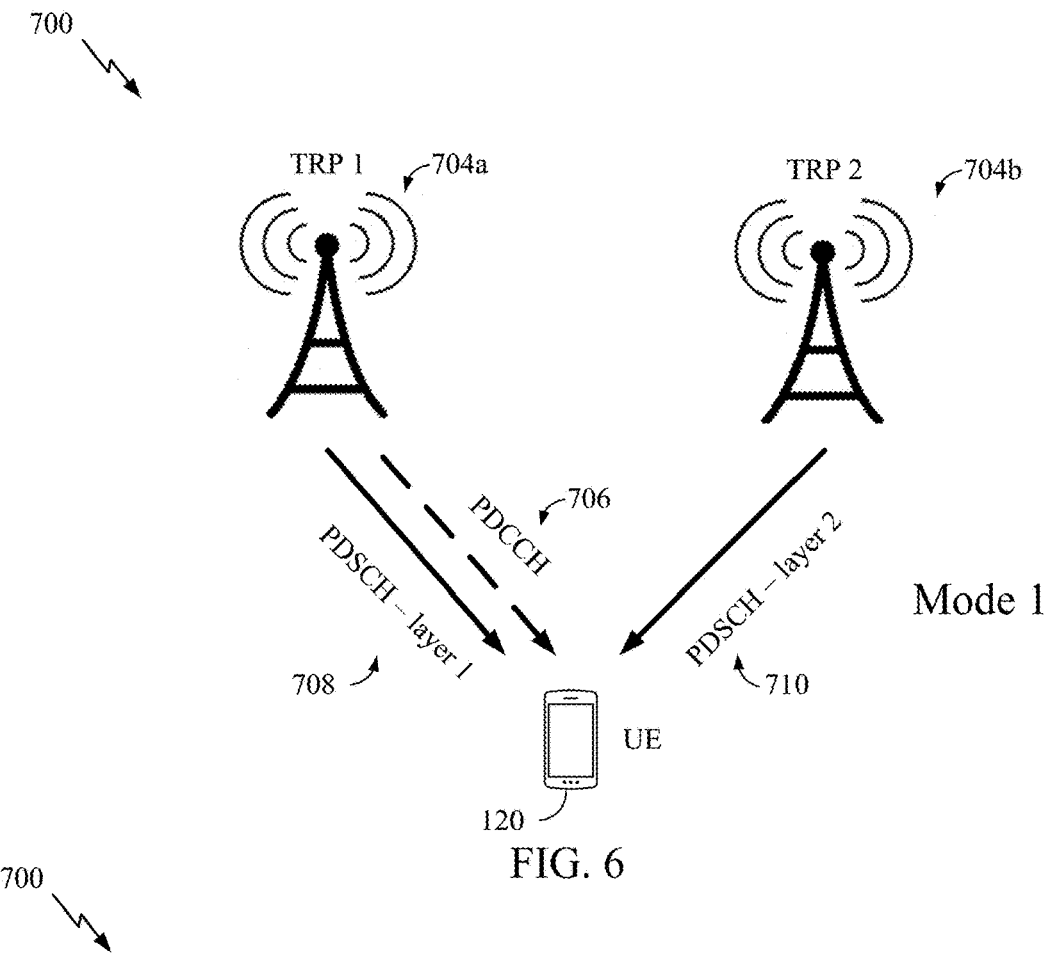
FIGS. 6 and 7 illustrate examples of multi-transmission reception point (multi-TRP) systems, in which aspects of the present disclosure may be practiced.
Figure 7:
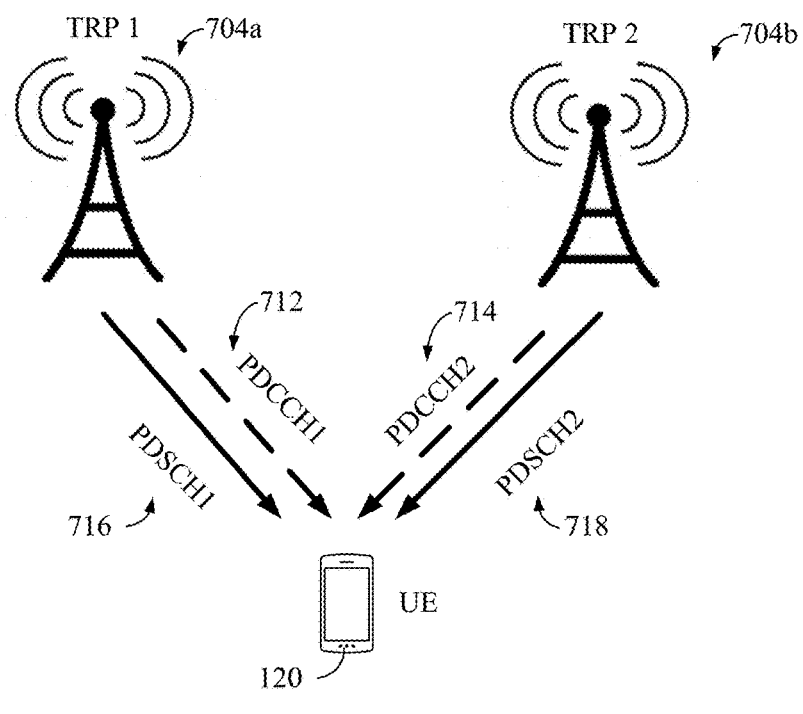

FIGS. 6 and 7 illustrate examples of wireless communication systems 600 and 700, respectively, which support BFR for a multi-TRP in a PCell, PScell, or Scell, in accordance with certain aspects of the present disclosure.

As shown in the examples of FIG. 6 FIG. 7, multi-TRP operation wireless communication systems may include a UE 120 and a number of TRPs 704a-b (collectively referred to herein as TRPs 704) associated with a PCell/PScell/Scell, which may be examples of the corresponding devices described herein. TRPs 704a-b may, in this example, provide a multi-TRP PCell/PScell/Scell in which a first beam of a first TRP 704a and a second beam of a second TRP 704b provide for communications with UE 120.

In some cases, as shown in the example multi-TRP operation wireless communication system 600 of FIG. 6, multi-TRP transmissions may be configured based on a single downlink control information (DCI) communication which (e.g., transmitted in a physical downlink control channel (PDCCH) 706 from TRP 704a) schedules downlink (DL) shared channel transmissions, such as physical downlink shared channel PDSCH 708 (e.g., Layer 1 (L1) PDSCH 708) transmitted from TRP 704a via the first beam and PDSCH 710 (e.g., Layer 2 (L2) PDSCH 710) transmitted from TRP 704b via the second beam. Configuration based on a single DCI communication may allow different TRPs (i.e., TRP 704a and TRP 704b) to transmit different spatial layers in overlapping RBs/symbols. In some examples, different TRPs 704 may transmit different RBs multiplexed on a DL carrier using frequency division multiplexing (FDM) techniques or different orthogonal frequency division multiplexing (OFDM) symbols multiplexed on the DL carrier using time division multiplexing (TDM) techniques. Multi-TRP operations configured based on a single DCI communication may result in ideal backhaul or backhaul with a small delay.

In some other cases, as shown in example multi-TRP operation wireless communication system 700 of FIG. 7, multi-TRP transmissions may be configured based on multiple DCI communications. In particular, a first DCI (e.g., transmitted in PDCCH 712 from TRP 704a) schedules a first DL shared channel transmission (e.g., PDSCH 716 transmitted from TRP 704a via the first beam), while a second DCI (e.g., transmitted in PDCCH 714 from TRP 704b) schedules a second DL shared channel transmission (e.g., PDSCH 718 transmitted from TRP 704*b* via the second beam). TRP 704 differentiation at UE 120, in some cases, may be based on a value of a CORESET pool index (e.g., CORESETPoolIndex), where each CORESET (e.g., up to a maximum of five CORESETs) can be configured with a value of a CORESET pool index. To support multiple PDCCH monitoring (e.g., at UE 120), as shown in FIG. 7, up to a maximum of five CORESETs can be configured with up to three CORESETs per TRP.

Figure 8:
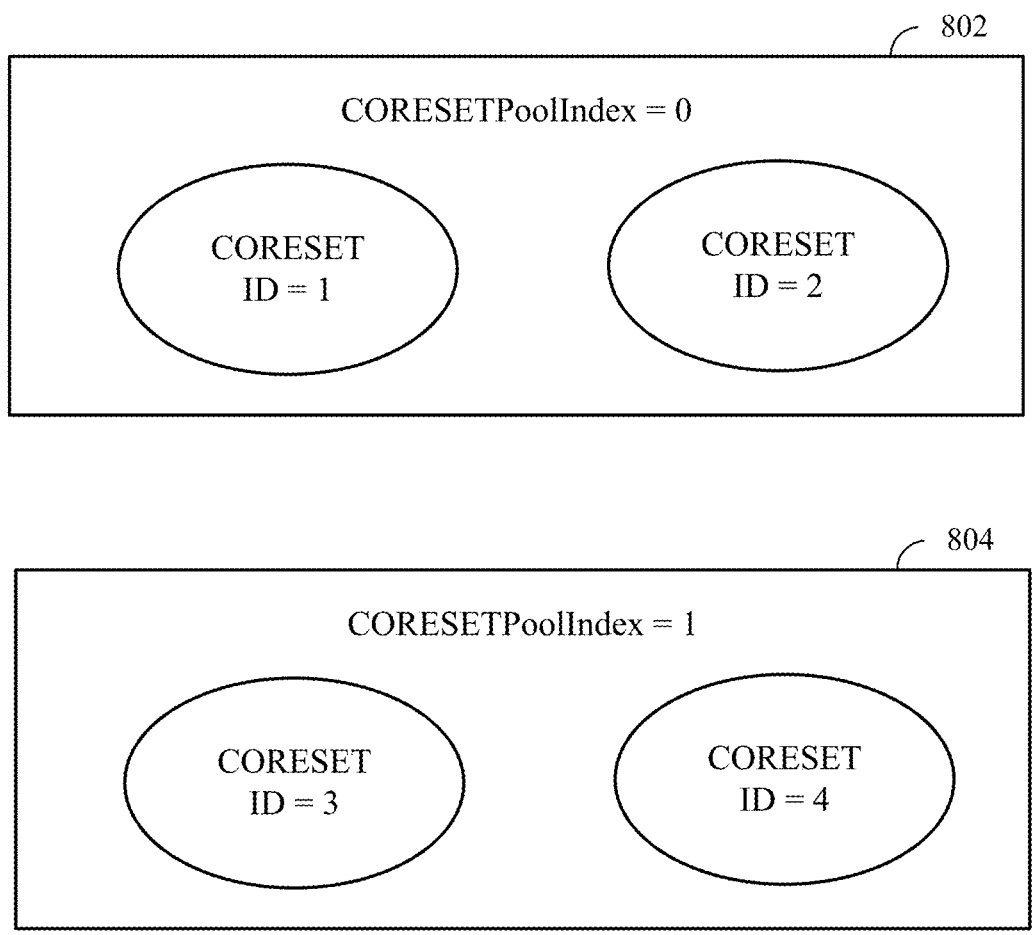
FIG. 8 illustrates example control resource set (CORE-SET) groups, in accordance with certain aspects of the present disclosure.

FIG. 8 illustrates example CORESET groups 800, in accordance with certain aspects of the present disclosure. As shown in FIG. 8, in some examples, the UE may be configured by a higher layer parameter, PDCCH-Config (e.g., a condition in 3GPP specification used to determine whether UE 120 is configured with multi-DCI based multi-TRP), which contains two different values of CORESET-PoolIndex in CORESETs for the active BWP of a serving cell. In some examples, the value of CORESETPoolIndex may be zero at 802 or one at 804, which groups the CORESETs into two groups, which may correspond to the different TRPs 704. Beyond the CORESET pool index distinction, UE 120 is oblivious to differences beyond identifying that different TRPs are used within the wireless communication system. Only some CCs may be configured with two values of CORESET PoolIndex, while other CCs may not be configured with two values of CORESET PoolIndex, and thus, BFD/BFR on a per-TRP 704 basis may be provided for CCs that are configured with two values of CORESET PoolIndex.

For example, in the non-limiting example shown in FIG. 7, the Pcell/PScell/Scell may be configured with two values of CORESET pool index, with one value associated with the first TRP, TRP 704*a*, and a second value associated with second TRP, TRP 704*b*. In this case, each TRP 704 may transmit one or more BFD RSs that may be monitored by UE 120. In this example, UE 120 may determine that the first beam of the first CORESET pool index value (e.g., CORE-SETPoolIndex=0) has a channel metric (e.g., an RSRP)) that is below a threshold value (e.g., when radio link quality is worse than a threshold Q_out for all the RSs in BFD resources that are associated with the first CORESET pool index value).

Accordingly, a UE may be configured for a carrier (e.g., an individual CC, BWP, and the like) associated with the Pcell/PScell/Scell that is configured with the first CORESET pool index value (e.g., CORESETPoolIndex=0) and a second CORESET pool index value (e.g., CORESETPoolIndex=1). The first CORESET pool index value may be associated with the first TRP, TRP 704*a*, of the Pcell/PScell/Scell, and the second CORESET pool index value may be associated with the second TRP, TRP 704*b*, of the Pcell/PScell/Scell. Each TRP 704 may transmit one or more BFD RSs that are associated with their respective value of the CORESET pool index. This may include two sets of BFD RSs (e.g., failureDetectionResources) being configured, with each set corresponding to a different value of a CORE-SET pool index.

In another example this may include each RS (e.g., each resource within failureDetectionResources) being configured with a CORESET pool index value. If the resource is not configured with a CORESET pool index value, it may be considered associated with CORESET pool index value 0 (e.g., the first CORESET pool index value).

Additionally, a resource may be configured with both values of CORESET pool indices. When the RSs (e.g., failureDetectionResources) are not configured, the RS sets indicated in the active transmission configuration indicator (TCI) states of CORESETS configured with CORESET pool index value equal to 0 or 1 (e.g., either CORESET pool index value) may determine the first or second set of resources, respectively. BFD for a value of CORESET pool index may be declared when the radio link quality is worse than Q_out for all the RSs and the BFD resources that are associated with that CORESET pool index value.

UE 120 may also receive or otherwise identify an indication of a set of candidate beams available for a BFR procedure. The set of candidate beams may include a first subset of candidate beams associated with the first CORE-SET pool index value (e.g., CORESETPoolIndex=0) and a second subset of candidate beams associated with the second CORESET pool index value (e.g., CORESETPoolIndex=1). In one example, this may include two lists of candidate beams (e.g., candidateBeamRSList) being configured, each corresponding to a different CORESET pool index value. That is, UE 120 may be separately configured with the first subset of candidate beams associated with the first CORE-SET pool index value and the second subset of candidate beams associated with the second CORESET pool index value.

UE 120 may detect or otherwise determine that a beam failure has occurred (e.g., the RSRP on the active beam is less than Q_out) on the carrier of the active beam (e.g., either the first beam or the second beam) of the Pcell/PScell/Scell. UE 120 may, based on the detected beam failure, select a new candidate beam from the set of candidate beams based on monitoring a resource (e.g., candidate beam detection (CBD) resources) associated with the first CORESET pool index value or the second CORESET pool index value. When BFD is declared for a CORESET pool index value, a new candidate beam (e.g., q_new) may be identified from within the candidate RSs associated with the same CORE-SET pool index value. In other words, UE 120 may select a new candidate beam from the set of candidate beams based on monitoring a resource (e.g., CBD resource(s)) associated with the first CORESET pool index value when a first beam experiences beam failure or the second CORESET pool index value when a second beam experiences beam failure. UE 120 may transmit or otherwise convey an access message to the Pcell/PScell/Scell (e.g., via the first TRP 704*a* if the conditions on the carrier permit and/or via the second TRP 704*b*) indicating the new candidate beam during the BFR procedure.

In certain aspects, UE 120 may receive or otherwise identify a first subset of random access resources (e.g., random access channel (RACH) resources/random access preamble indices) associated with the first subset of CBD resources corresponding to the first subset of candidate beams and a second subset of random access resources associated with a second subset of CBD resources corresponding to the second subset of candidate beams. That is, dedicated RACH resources for BFR may also be associated with each of the different CORESET pool index values. In some examples, this may include an implicit indication based on an association of a RACH resource/random access preamble index with a candidate beam RS (e.g., as each candidate beam RS is already associated with a CORESET pool index value). The network (e.g., Pcell/PScell/Scell) may determine which TRP/CORESET pool index value has experienced a beam failure (and the corresponding new beam q_new) in the Pcell/PScell/Scell based on the resource/random access preamble index of the received RACH (e.g., based on the random access resource used for transmitting the access message).

In some examples this may include two lists of RACH resources/random access preamble indices being configured, with each list of RACH resource/random access preamble index being associated with one of the CORESET pool index values. For example, UE 120 may receive an indication of a first set of random access resources associated with the first CORESET pool index value and a second set of random access resources associated with the second CORESET pool index value. Thus, in one example, UE 120 may determine that the new candidate beam is associated with the first subset of candidate beams and select a random access resource from the first set of random access resources corresponding to the new candidate beam to transmit the access message. In another example, UE 120 may determine that the new candidate beam is associated with the second subset of candidate beams and select a random access resource from the second set of random access resources corresponding to the new candidate beam to transmit the access message.

UE 120 may transmit, or otherwise convey, the access message utilizing the corresponding RACH resources/random access preamble to carry or otherwise convey an indication of the CORESET pool index value associated with the beam failure. UE 120 may reset the active beam associated with the TRP 704 experiencing the beam failure.

In some examples, this may include updating various quasi-colocation (QCL) relationships. Generally, QCL relationships between different beams may indicate that various radio propagation properties are the same or similar for these different beams. For example, UE 120 may determine that the new candidate beam is associated with the first CORESET pool index value and, therefore, update the QCL relationship for a CORESET with index 0 (e.g., the CORESET that is used for common search space procedures). The updated QCL relationship may correspond to the QCL configuration of the new candidate beam. That is, when the new candidate beam (e.g., q_new) corresponds to CORESET pool index value 0, the QCL assumptions for CORESET 0 may be updated (e.g., after 28 symbols after the last symbol carrying PDCCH). Accordingly, the updated QCL configuration may occur after a threshold time period. The QCL assumption (e.g., QCL configuration) for CORESET 0 may not be updated when the new candidate beam (e.g., q_new) corresponds to CORESET pool index value 1 (e.g., the second CORESET pool index value). In some examples, this may be based on CORESET 0 being typically associated with CORESET pool index value 0.

In some examples, this may include UE 120 determining that the new candidate beam is associated with the first or second CORESET pool index values. Accordingly, UE 120 may update the QCL relationship for each CORESET associated with the first CORESET pool index value or second CORESET pool index value, respectively. Again, the updated QCL relationship may correspond to the QCL configuration of the new candidate beam. That is, when the new candidate beam (e.g., q_new) corresponds to either CORESET pool index value, the QCL assumption for all CORESETS associated with the same CORESET pool index value may be reset to the new candidate beam (e.g., 28 symbols after the last symbol carrying PDCCH). The set of activated TCI states for a PDSCH that correspond to the same value of CORESET pool index may be reset to the new candidate beam. Accordingly, UE 120 may update the activated set of TCI states for a data channel to a TCI state of the new candidate beam.

In certain aspects, this may include UE 120 determining that the new candidate beam is associated with the first or second CORESET pool index value. UE 120 may update the CORESET pool index value of a common CORESET accordingly. For example, UE 120 may update the CORESET pool index value of the common CORESET to correspond to the CORESET pool index value of the new candidate beam. That is, when the new candidate beam corresponds to the first or second CORESET pool index value and one CORESET (e.g., the common CORESET) is configured for BFR, the CORESET pool index value of the CORESET that is associated with recovery search space ID(s) (e.g., recoverySearchSpaceId(s)) may be reset to the CORESET pool index value that the new candidate beam corresponds to.

In some examples, UE 120 may treat the second CORESET pool index value (e.g., CORESETPoolIndex=1) as an SCell for the BFR procedure. That is, UE 120 may determine that the beam failure on the active beam of the PCell is associated with the first CORESET pool index value (e.g., CORESETPoolIndex=0 and is associated with the first TRP, TRP 704a) and, therefore, perform a PCell BFR procedure. When BFD is detected for the first CORESET pool index value (e.g., CORESETPoolIndex=0), the procedures corresponding to a PCell BFR procedure may be followed (e.g., RACH transmission, PDCCH reception in a recovery search ID, etc.). However, UE 120 may determine that the beam failure on the active beam of the PCell is associated with the second CORESET pool index value (e.g., CORESETPoolIndex=1 and is associated with the second TRP, TRP 704b) and, therefore, perform an SCell BFR procedure. If BFD is detected for the second CORESET pool index value (e.g., CORESETPoolIndex=1) for the PCell, the procedures corresponding to an SCell BFR procedure may be followed. For example, a link recovery request (LRR) message may be transmitted in a configured PUCCH resource, and a grant scheduling an uplink (UL) transmission for UE 120 may be received in response. In this situation, the medium access control (MAC) control element (CE) (MAC-CE) beam failure response may convey an indication of an additional Ci field (where i is the CellIndex) and corresponding candidate RS ID fields (e.g., when Ci=1) associated with CORESET pool index value 1 in the PCell.

Examples of BFD, CBD, beam recovery, and the like, are discussed with reference to FIG. 9 which generally illustrates a PCell BFR procedure and with reference to FIG. 10 which generally illustrates an SCell BFR procedure.

Figure 9:
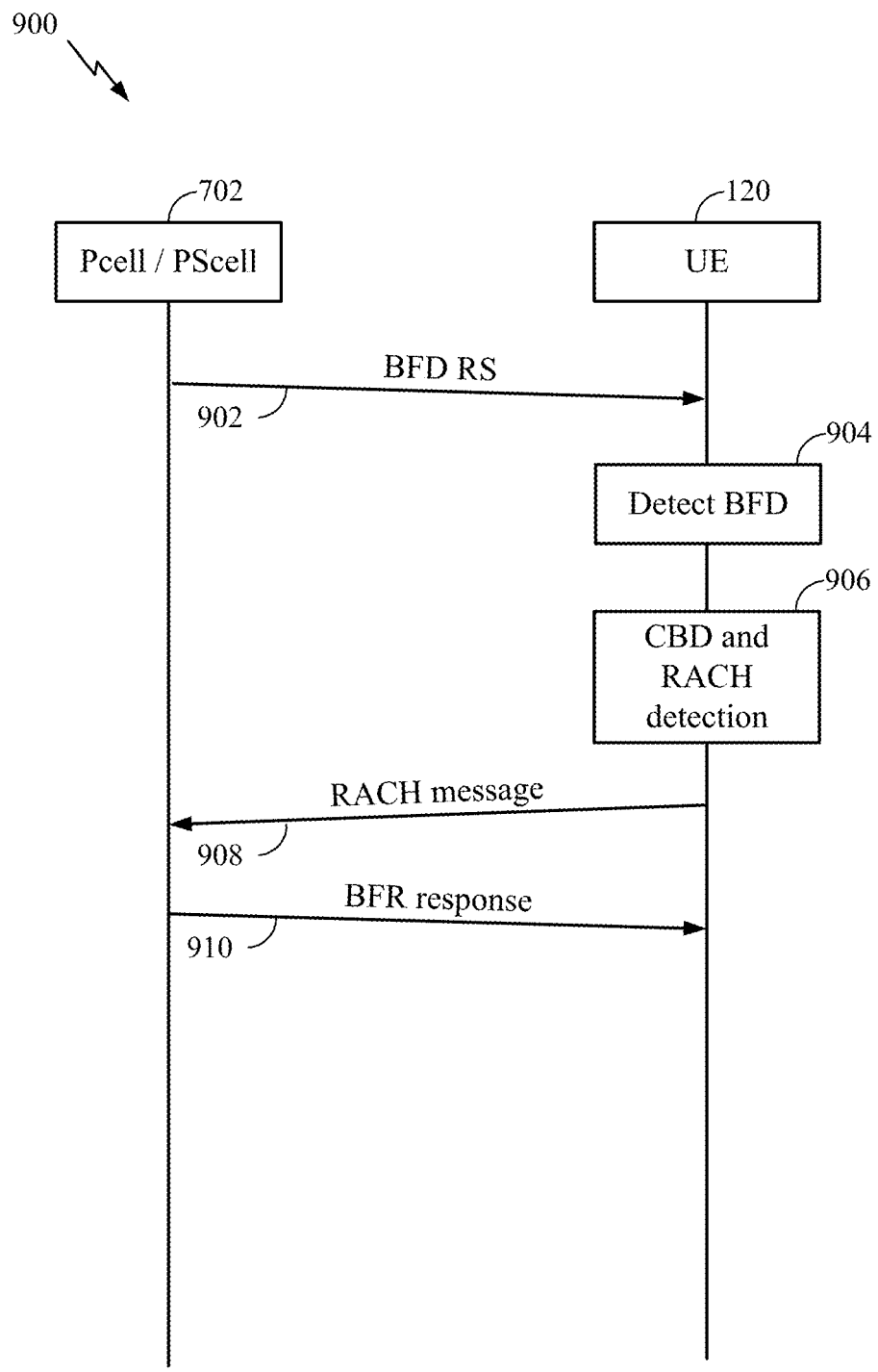
FIG. 9 is a call flow diagram illustrating an example beam failure recovery (BFR) process, in accordance with certain aspects of the present disclosure.

FIG. 9 illustrates an example of a process 900 that supports BFR for multiple-TRPs in a PCell/PScell, in accordance with certain aspects of the present disclosure. In some examples, process 900 may implement aspects of wireless communication systems 100. Features of process 900 may be implemented by a PCell/PScell 902 and/or a UE 904. In some examples, PCell/PScell 902 may be associated with multiple TRPs.

PCell/PScell 902 may configure UE 904 with a carrier that is configured with, or otherwise associated with, a first CORESET pool index value (e.g., CORESETPoolIndex=0) and a second CORESET pool index value (e.g., CORESETPoolIndex=1). PCell/PScell 902 may also configure UE 904 with a set of candidate beams available for a BFR procedure, the set of candidate beams including a first subset of candidate beams associated with the first CORESET pool index value and a second subset of candidate beams associated with the second CORESET pool index value.

At 910, PCell/PScell 902 may transmit (and UE 904 may receive), a configuration for BFD RSs. That is, BFD may be based on periodic channel state information-reference signal (CSI-RS) resources configured by radio resource control (RRC) (e.g., RRC parameter failureDetectionResoruces). Up to two single port RSs may be configured. If not configured, the RS sets indicated by the active TCI states of CORESETs monitored by UE 120 may be used. For an active TCI state of a CORESET, there may be two RS indices, e.g., with QCL Type-D, that may be used.

At 912, UE 904 may determine or otherwise declare a beam failure on an active beam of PCell/PScell 902 associated with the first CORESET pool index value or the second CORESET pool index value. In some examples, the physical (PHY) layer of UE 120 may assess the radio link quality according to the BFD set against a threshold (e.g., Q_out). If the radio link quality is worse than Q_out for all of the RSs in the BFD resource set, the PHY layer may provide an indication to higher layers, e.g., an indication that a beam failure has been detected.

At 914, UE 904 may select a new candidate beam based on monitoring a resource associated with the first CORESET pool index value or the second CORESET pool index value, e.g., perform CBD. In some examples, CBD may be based on periodic CSI-RSs/SSBs configured by RRC (e.g., RRC parameter candidateBeamRSList). In some examples, up to 16 resources may be configured with the corresponding random access preamble index (e.g., for RACH). Upon request from higher layers, UE 120 may provide a reference signal index and RSRP among the lists that have equal or larger RSRP values than q_in (e.g., a configurable threshold). UE 904 may initiate RACH procedures (e.g., contention-free RACH procedures) based on the random access resource (e.g., random access preamble index) associated with a selected RS index with an RSRP value above the threshold (e.g., RS index q_new). Accordingly, at 916, UE 904 may transmit (and PCell/PScell 902 may receive) a RACH message, e.g., the access message.

At 918, PCell/PScell 902 may transmit (and UE 904 may receive) a BFR response. For example, UE 904 may monitor PDCCH in a search space set, such as provided by a parameter recoverySearchSpaceID, for detection of a DCI format, for example that is cyclic redundancy check (CRC) scrambled by a cell radio network temporary identifier (C-RNTI) or a modulation and coding scheme RNTI (MCS-C-RNTI), such as starting from slot n+4. This may correspond to a random access response (e.g., BFR response in this case). If UE 904 receives the PDCCH within a window, the BFR procedure may be considered complete. In some aspects, the CORESET associated with the secondary synchronization signal (SSS) provided by recoverySearchSpaceID may not be used for any other SSS.

Typically, various QCL assumptions may be adopted after RACH. For PDCCH monitoring and an SSS provided by recoverySearchSpaceID and for corresponding PDSCH receptions, UE 904 may assume the same QCL parameters as the ones associated with the RS index q_new (e.g., the QCL parameters of the new candidate beam) until UE 904 receives, e.g., by higher layers, an activation for a TCI state, or any of the parameters TCI-StatesPDCCH-ToAddList and/or TCI-StatesPDCCH-ToReleaseList. After, for example, the 28th symbol from a last symbol of a first PDCCH reception and a SSS provided by recoverySearchSpaceID where UE 904 detects a DCI format with CRC scrambled by a C-RNTI or an MCS-C-RNTI, UE 904 may assume the same QCL parameters as the ones associated with the RS index q_new for PDCCH monitoring in a CORESET with pool index value 0.

However, according to certain aspects, UE 904 may monitor for an access response message (e.g., the BFR response) on a first recovery search configured with a first CORESET that is associated with the first CORESET pool index value or on a second recovery search space configured with a second CORESET that is associated with the second CORESET pool index value. That is, two different CORESETs may be associated with two different recovery search spaces (e.g., two recoverySearchSpaceIDs can be configured). As mentioned, the two CORESETs may be configured with different CORESET pool index values. A recoverySearchSpaceID may be associated with a CORESET pool index value through the corresponding CORESET. Accordingly, in some examples, UE 904 may determine that the new candidate beam is associated with the first subset of candidate beams and monitor for an access response message (e.g., the BFR response) on the first recovery search space. Similarly, in some other examples, UE 904 may determine that the new candidate beam is associated with the second subset of candidate beams and monitor for an access response message (e.g., the BFR response) on the second recovery search space. UE 904 may receive a control channel signal (e.g., PDCCH, which may include the access response message, or BFR response in this example) in the corresponding recovery search space and determine that the BFR procedure is complete based, at least in part, on receiving the control channel signal in the corresponding recovery search space.

In some aspects, only one CORESET may be used for BFR purposes. For example, UE 904 may monitor for the access response message (e.g., the BFR response) on a first recovery search space associated with the first CORESET pool index value or on a second recovery search space associated with the second CORESET pool index value. In this example, the first and second recovery search spaces may be associated with a common CORESET (e.g., the single CORESET used for BFR purposes). In one example, this may include two recoverySearchSpaceIDs being configured, both associated with the same CORESET. The first recovery search space (e.g., the first recoverySearchSpaceId) may be associated with the first CORESET pool index value (e.g., CORESETPoolIndex=0) and the second recovery search space (e.g., the second recoverySearchSpaceID) may be associated with the second CORESET pool index value (e.g., CORESETPoolIndex=1). This association between the second recovery search space and the second CORESET pool index value may be a direct association (e.g., not through the CORESET).

If the RACH message transmitted at 916 in slot n is associated with a new candidate beam (e.g., q_new) that is associated with a CORESET pool index value, UE 904 may monitor PDCCH in a search space set provided by recoverySearchSpaceID that is associated with the same CORESET pool index value, such as for detection of a DCI format with CRC scrambled by a C-RNTI or an MCS-C-RNTI starting from, for example, slot n+4. The BFR procedure for a CORESET pool index value may be completed at 918 when UE 904 receives a PDCCH (e.g., the BFR response) in the corresponding recovery search space. The PDCCH, and a corresponding PDSCH, may use the same beam as q_new uses (e.g., the new candidate beam).

Accordingly, UE 904 may determine that the new candidate beam is associated with the first subset of candidate beams and monitor for an access response message (e.g., the BFR response) on the first recovery search space. Similarly, UE 904 may determine that the new candidate beam is associated with the second subset of candidate beams and monitor for an access response message (e.g., the BFR response) on the second recovery search space. UE 904 may receive a control channel signal (e.g., PDCCH, which may be an example of the access response message, or BFR response in this example) in the corresponding recovery search space and determine that the BFR procedure is complete, at 918, based on receiving the control channel signal in the corresponding recovery search space.

Figure 10:
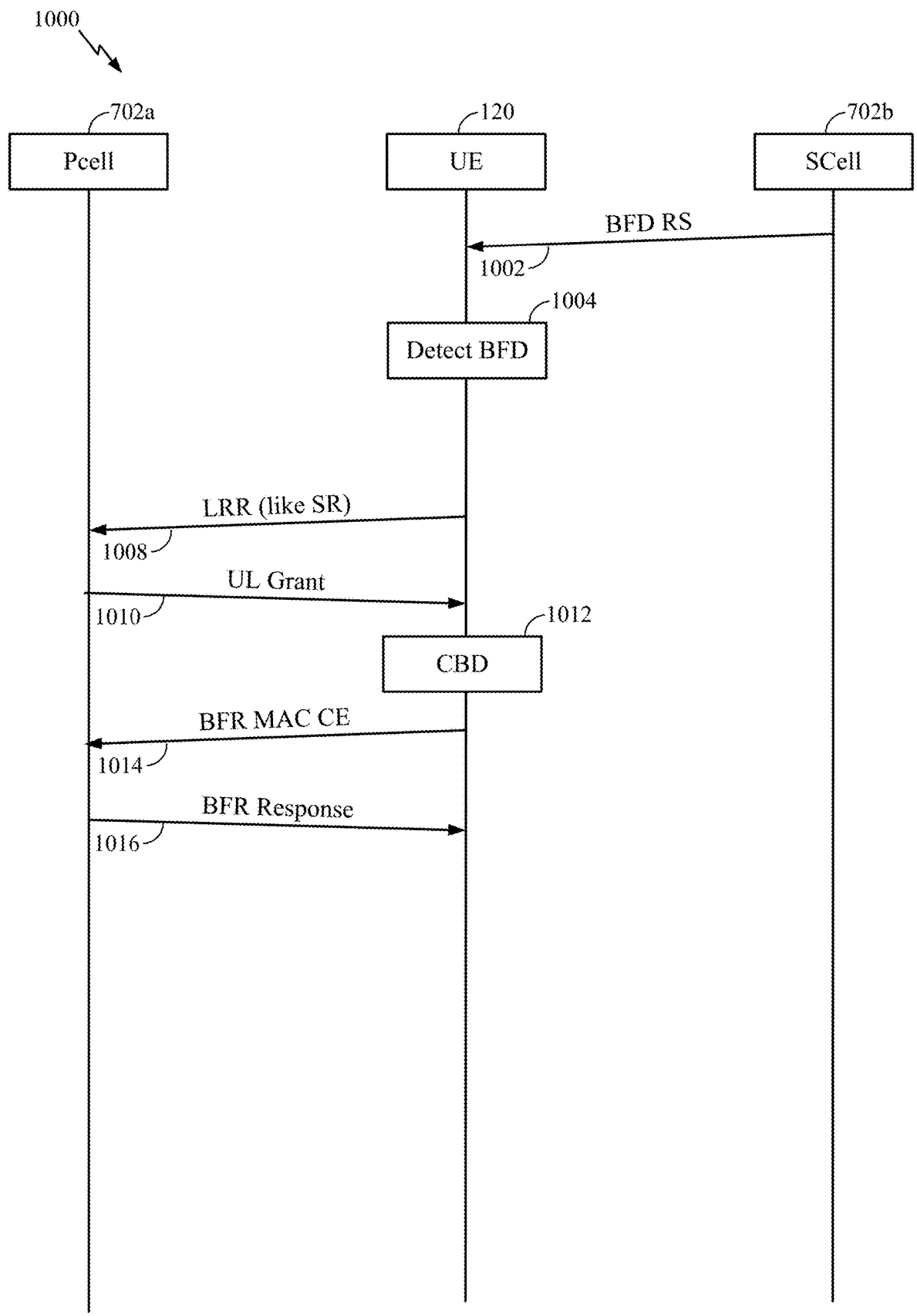
FIG. 10 is a call flow diagram illustrating another example BFR process, in accordance with certain aspects of the present disclosure.

FIG. 10 illustrates an example of a process that supports BFR for multi-TRPs in a PCell, in accordance with certain aspects of the present disclosure. In some examples, process 1000 may implement aspects of wireless communication systems 100. Aspects of process 1000 may be implemented by a PCell 1002, a UE 1006, and/or an SCell 1004, which may be examples of corresponding devices described herein. In some aspects, PCell 1002 and/or SCell 1004 may each be associated with multiple TRPs. Process 1000 illustrates an example of an SCell BFR procedure that may be modified, at least in some aspects, according to the described techniques when a carrier on PCell 1002 experiences beam failure.

PCell 1002 may configure UE 1006 with a carrier that is configured with, or otherwise associated with, a first CORESET pool index value (e.g., CORESETPoolIndex=0) and a second CORESET pool index value (e.g., CORESETPoolIndex=1). PCell 1002 may also configure UE 120 with the set of candidate beams available for a BFR procedure, the set of candidate beams including a first subset of candidate beams associated with the first CORESET pool index value and a second subset of candidate beams associated with the second CORESET pool index value.

At 1010, SCell 1004 may transmit (and UE 120 may receive) a configuration for BFD RSs. That is, BFD may be based on periodic CSI-RS resources configured by RRC (e.g., RRC parameter failureDetectionResources). At 1012, UE 1006 may determine or otherwise detect a beam failure on an active beam of SCell 1004 associated with the first CORESET pool index value or the second CORESET pool index value.

At 1012, UE 1006 may declare a beam failure and initiate BFR. Although process 1000 illustrates beam failure based on the RSs and BFD based on SCell 1004, similar processes may be used for BFD on PCell 1002. That is, although process 1000 illustrates UE 120 detecting or otherwise declaring BFD on SCell 1004, it is to be understood that, in accordance with the described techniques, UE 120 may similarly detect or otherwise declare BFD on a carrier of PCell 1002.

At 1014, UE 1006 may transmit (and PCell 1002 may receive) an LRR message. The LRR message may be transmitted on PCell 1002 (e.g., PUCCH-PCell and/or PUCCH-SCell) in which the PUCCH BFR is configured. The LRR message may be similar to a scheduling request (SR) and use PUCCH format 0 or 1. The LRR message may be transmitted in a UL control channel.

At 1016, PCell 1002 may transmit (and UE 1006 may receive) a normal UL grant. The UL grant may include or use C-RNTI/MCS-C-RNTI and may serve as a response message to the LRR message. The UL grant may schedule a PUSCH for UE 120 in which a BFR MAC CE may be transmitted. If UE 1006 already has an UL grant configured, the LRR message transmitted at 1014 and the UL grant transmitted at 1016 may be skipped.

At 1018, UE 1006 may perform CBD. That is, before sending the BFR response indicating the MAC CE, UE 1006 may identify the suitable (e.g., best) new beam (e.g., select a new candidate beam) for the failed SCell 1004 (or PCell 1002 in this example). CBD may be similar to the description provided in process 900 of FIG. 9. Up to 64 resources (e.g., candidateBeamRSSCellList, or candidateBeamRSP-CellList in this example) may be configured in the set of candidate beams and they may be transmitted on the failed SCell 1004 (or PCell 1002 in this example) or on another CC in the same band. In some aspects, the BFR procedure illustrated in process 1000 may not include a RACH process and, therefore, CBD resources may not be associated with a RACH resource.

At 1020, UE 1006 may transmit (and PCell 1002 may receive) a BFR MAC CE. In some aspects, the BFR MAC CE may carry or otherwise convey an indication of which cell the beam failure has occurred (e.g., an SCell 1004 index, or a PCell 1002 index in this example) and/or identify potential new candidate beams. For example, the BFR MAC CE may include a first row of $C_i$ indications (e.g., up to eight $C_i$ indications), with each $C_i$ indication set to 1 to indicate that BFD has occurred in that CC. For each $C_i$ indication set to 1, a subsequent row in the MAC CE may include an availability indication (AC) field set to 1 indicating that the candidate RS ID field is present. The remaining bits in the row may carry the candidate RS ID. The BFR MAC CE may be transmitted to PCell 1002 and/or SCell 1004 (e.g., may be transmitted to any cell, including the failed cell).

Accordingly, in certain aspects UE 1006 may configure the access message (e.g., BFR MAC CE) to indicate the CORESET pool index value associated with the detected beam failure. That is, the MAC CE may explicitly indicate the CORESET pool index value corresponding to the BFD.

At 1022, PCell 1002 may transmit (and UE 1006 may receive) a BFR response. In some aspects, the BFR response to the MAC CE may be an UL grant scheduling a new transmission (e.g., with a toggled new data indicator (NDI), meaning it is set to a value indicated there is new data) for the same hybrid automatic repeat request (HARM) process as the PUSCH carrying the MAC CE. If the new candidate beam is reported in the BFR MAC CE, 28 symbols from the end of the BFR response (e.g., in the PDCCH), all CORESET beams on the failed cell (e.g., SCell 1004, or PCell 1002 in this example), may be reset to the new candidate beam. If the failed cell is a PUCCH-SCell, the PUCCH-spatialRelationInfo may be configured. If the LLR is not transmitted on the failed cell, PUCCH beams on the failed cell may be reset to the new candidate beam.

After receiving the control channel signal (e.g., PDCCH, which may be an example of the access response message, or BFR response in this example) in the corresponding recovery search space, at 101022, UE 1006 may determine that the BFR procedure is complete.

Figure 11A:
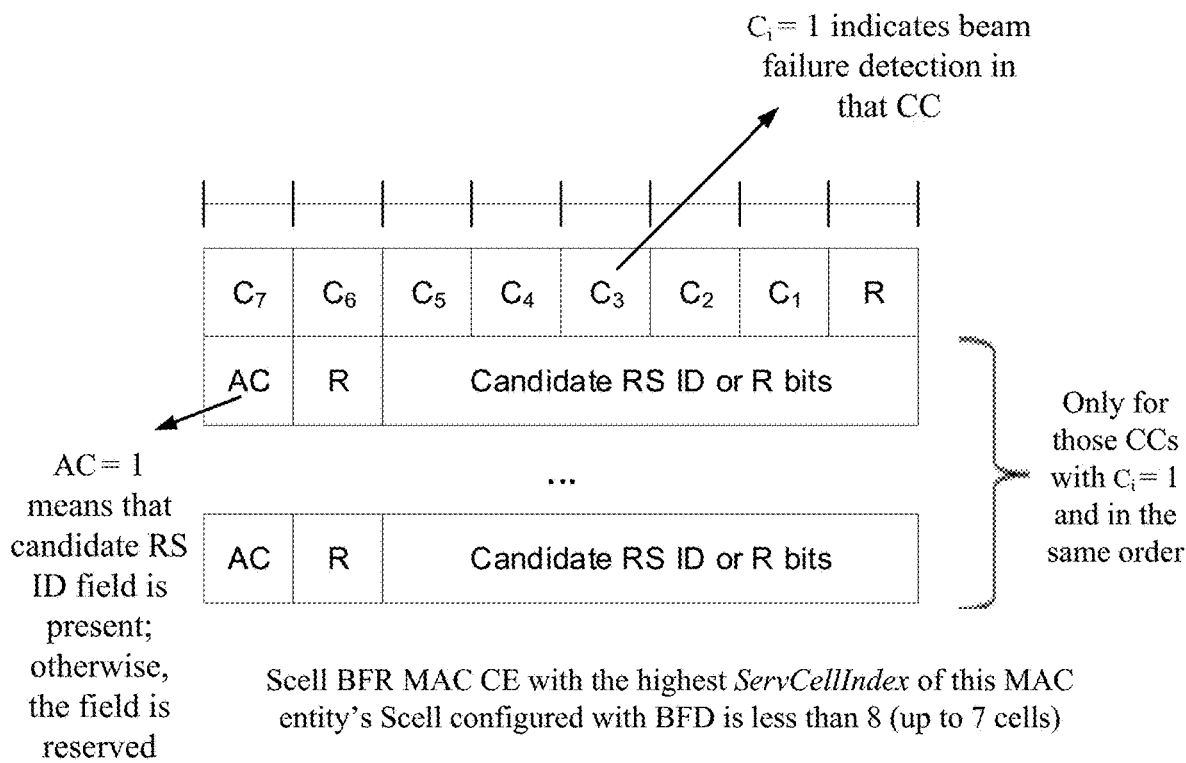
FIGS. 11A and 11B illustrate example BFR medium access control (MAC)-control element (CE) (MAC-CE) structures, in accordance with certain aspects of the present disclosure.
Figure 11B:
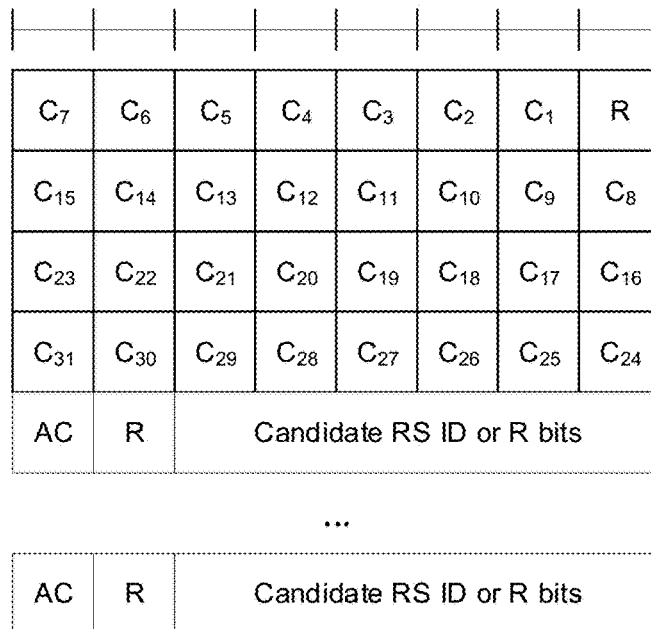

FIGS. 11A and 11B illustrate example MAC-CE structures 1100A and 1100B, respectively, which may be used for BFR purposes, in accordance with certain aspects of the present disclosure. In particular, FIG. 11A shows an example SCell BFR MAC CE with a highest SERVCellIndex less than eight (e.g., MAC-CE structure 1100A includes a first row of up to seven $C_i$ indications for seven SCells). A Ci indication equal to 1 indicates a BFD in that CC. And when Ci=1, the BFR MAC-CE may convey an indication of an additional Ci field and corresponding AC/candidate RS ID fields associated with the CORESET pool index value in the PCell. The AC field may correspond to the candidate RS ID field. As another example, FIG. 11B illustrates an example SCell BFR MAC-CE with a field structure which includes a highest SERVCellIndex greater than 8 (21 in this example).

Example Transmission Reception Point
(TRP)-Specific Beam Failure Recovery Request
(BFRQ) Transmission As mentioned above, in some scenarios, a UE may be provided with beam failure detection (BFD) resources enabling the UE to perform BFD and candidate beam detection (CBD) operations. However, the introduction of a multiple transmission reception point (multi-TRP) operation (e.g., used to increase system capacity as well as reliability in the wireless communication system) may present certain challenges with regard to BFD and BFR procedures.

Aspects of the present disclosure provide techniques and apparatuses for per-TRP BFR in multi-TRP modes, which may enable separate BFD and separate CBD for beams corresponding to a TRP in a component carrier (CC) that is configured with two values of CORESET pool indices.

Potential enhancements to enable per-TRP based beam failure recovery may include TRP-specific BFD, TRP-specific new candidate beam identification, TRP-specific beam failure recovery request (BFRQ), base station (BS) (e.g., gNB) response enhancement, and UE behavior clarification on quasi co-location (QCL), spatial relation assumption, uplink (UL) power control for downlink (DL) and UL channels, and after receiving the response from the BS.

Aspects of the present disclosure provide enhancements to enable per beam group based (effectively per-TRP based) beam failure recovery, and more particularly, techniques for per-transmission reception point (per-TRP)-specific beam failure recovery request (BFRQ) transmission. As discussed herein, the TRP-specific BFRQ transmission may be performed using uplink control information (UCI)-based BFRQ and/or random access channel (RACH)-based BFRQ.

Because each TRP may have an associated beam group (a set of beams used to communicate with that TRP), a beam group may effectively identify a TRP. A UE may not actually know a TRP identifier (ID) but may, rather, know a beam group ID (and/or beams in a corresponding beam group).

As used herein, UCI-based BFRQ generally refers to BFRQ information carried in a UCI, and does not require additional medium access control (MAC) control element (CE) or random access channel (RACH) resources to convey the TRP (beam group) specific BFR information.

As used herein, RACH-based BFRQ generally refers to BFRQ carried in a RACH preamble (e.g., Msg1 in contention free RACH), sent as part of the RACH procedure, and does not require additional uplink control information (UCI) or medium access control (MAC) control element (CE) to convey the TRP specific BFR information. RACH-based BFRQ may use contention-free random access (CFRA) resources for TRP-specific BFR purposes.

As will be described in greater detail below, TRP specific candidate beam detection mechanisms may include various options for associating measured candidate beams for BFR to a TRP (or beam group). The association between candidate beams and a TRP may be based on an explicit configuration (as shown in FIG. 14A) or may be implicitly inferred from a DL beam indication used by the candidate beam.

As will be described in greater detail below, TRP-specific UCI based BFRQ transmission may be performed by transmitting a UCI that indicates a BFRQ specific to a beam group in which a beam failure was detected. The UCI may be sent using a physical uplink control channel (PUCCH) resource. The PUCCH may be either a TRP specific PUCCH resource, a single PUCCH resource, or a set of PUCCH resources.

Figure 12:
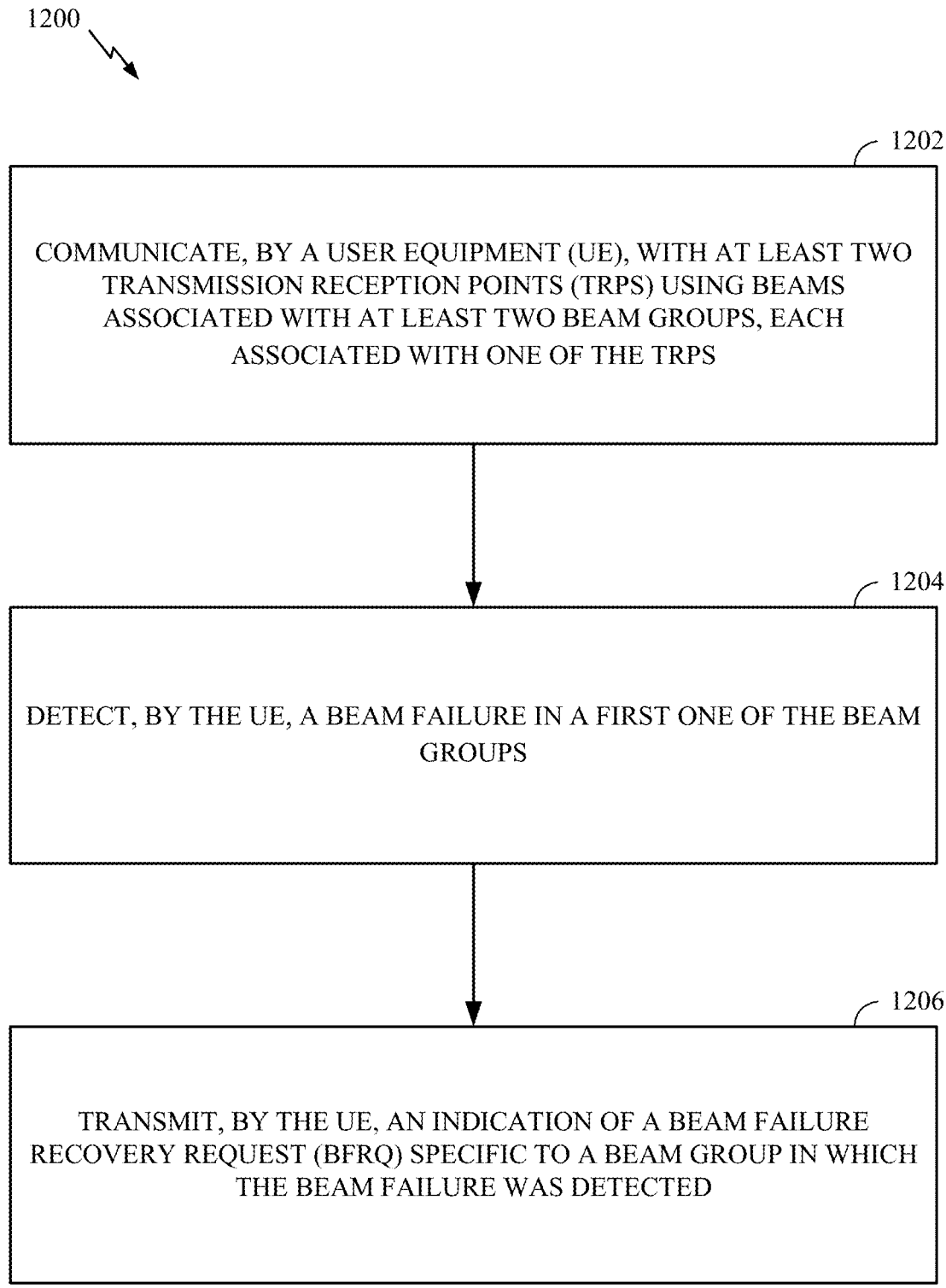
FIG. 12 is a flow diagram illustrating example operations for wireless communication by a UE, in accordance with certain aspects of the present disclosure.

FIG. 12 is a flow diagram illustrating example operations 1200 for wireless communication by a user equipment (UE), in accordance with certain aspects of the present disclosure. Operations 1200 may be performed, for example, by UE 120a in the wireless communication network 100 illustrated in FIG. 1. In some aspects, operations 1200 may be implemented as software components that are executed and run on one or more processors (e.g., controller/processor 280 of FIG. 2). Further, the transmission and reception of signals by the UE in operations 1200 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 1200 begin, at block 1202, by the UE communicating with at least two transmission reception points using beams associated with at least two beam groups, each associated with one of the TRPs.

At block 1204, the UE detects a beam failure in a first beam group of the at least two beam groups.

At block 1206, the UE indicates a BFRQ specific to a beam group in which the beam failure was detected. For example, to indicate a BFRQ specific to a beam group in which the beam failure was detected, the UE can transmit an indication of the BFRQ in uplink control information (UCI) signaling, in one or more messages in a random access procedure carried on a RACH (e.g., RACH Msg 1), or the like.

Figure 13:
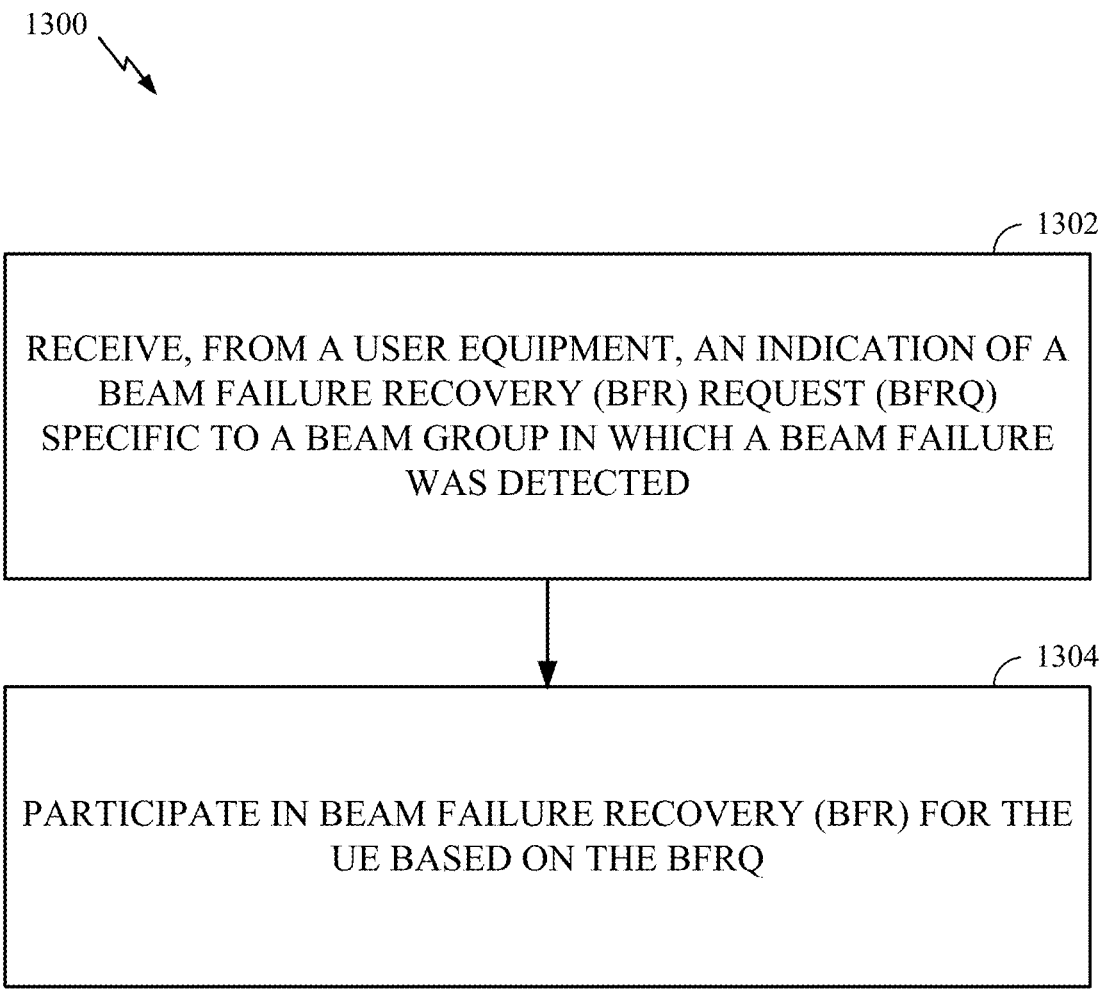
FIG. 13 is a flow diagram illustrating example operations for wireless communication by a network entity, in accordance with certain aspects of the present disclosure.

FIG. 13 is a flow diagram illustrating example operations 1300 for wireless communication by a network entity, in accordance with certain aspects of the present disclosure. Operations 1300 may be performed, for example, by BS 110a in the wireless communication network 100 illustrated in FIG. 1. In some aspects, operations 1300 may be implemented as software components that are executed and run on one or more processors (e.g., controller/processor 240 of FIG. 2). Further, the transmission and reception of signals by the BS in operations 1300 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

Operations 1300 begin, at block 1302, by the network entity receiving, from a user equipment, an indication of a beam failure recovery (BFR) request (BFRQ) specific to a beam group in which a beam failure was detected. The indication may be received, for example, in uplink control information (UCI) signaling from a UE, in one or more messages in a random access procedure carried on a RACH (e.g., RACH Msg 1), or the like At 1304, the network entity participates in beam failure recovery (BFR) for the UE based on the BFRQ.

TRP-specific candidate beam detection mechanisms may include various options for associating measured candidate beams for BFR to a TRP. For example, the association between candidate beams and a TRP may be based on an explicit configuration, as shown in FIG. 14. As illustrated, an information element 1400 in which information about candidate beams may include information identifying a candidate beam configuration, a serving cell identifier, and a TRP identifier (in the TRPId field) associated with the candidate beam for which configuration information is carried in the information element 1400.

In some aspects, the association between candidate beams and a TRP may be implicitly inferred from a downlink beam indication used by the candidate beam and that is uniquely used by the TRP (part of a corresponding beam group), for example, based on a QCL uniquely assigned to the PDCCH/PDSCH of a TRP.

Whether a beam candidate configuration is determined explicitly or implicitly, if BFR is triggered for a failed TRP (or beam group), the UE may perform candidate beam detection (CBD). CBD operations may include measuring corresponding candidate beams for BFR for this failed TRP. CBD detection of a beam group ID may be implicitly inferred from a downlink (DL) beam indication. The downlink beam indication may be used by the candidate beam and a same beam uniquely used by that beam group (associated with a TRP) for downlink transmission. Among the candidate beams associated with the TRP ID, the UE will select one candidate beam with a reference signal quality above a threshold.

In some examples, for the selected candidate beam, the UE may send the candidate beam in a report via a MAC-CE (i.e., MAC layer communication structure that may be used for control command exchange between wireless nodes). In some examples, for the selected candidate beam, the UE may initiate RACH based TRP specific BFRQ and send the candidate beam on the RACH preamble to one of the corresponding RACH occasions (e.g., ra-OccasionList).

Operations 1200 illustrated in FIG. 12 and operations 1300 illustrated in FIG. 13 for TRP-specific BFRQ transmission may be understood with reference to the example call flow diagrams 1500, 1600, 1700, 1800, and 1900 of FIGS. 15, 16, 17, 18, and 19. In these example call flow diagrams, a TRP-specific BFRQ transmission may be carried in uplink control information (UCI) transmitted from a UE to a TRP on a physical uplink control channel (PUCCH).

Figure 15:
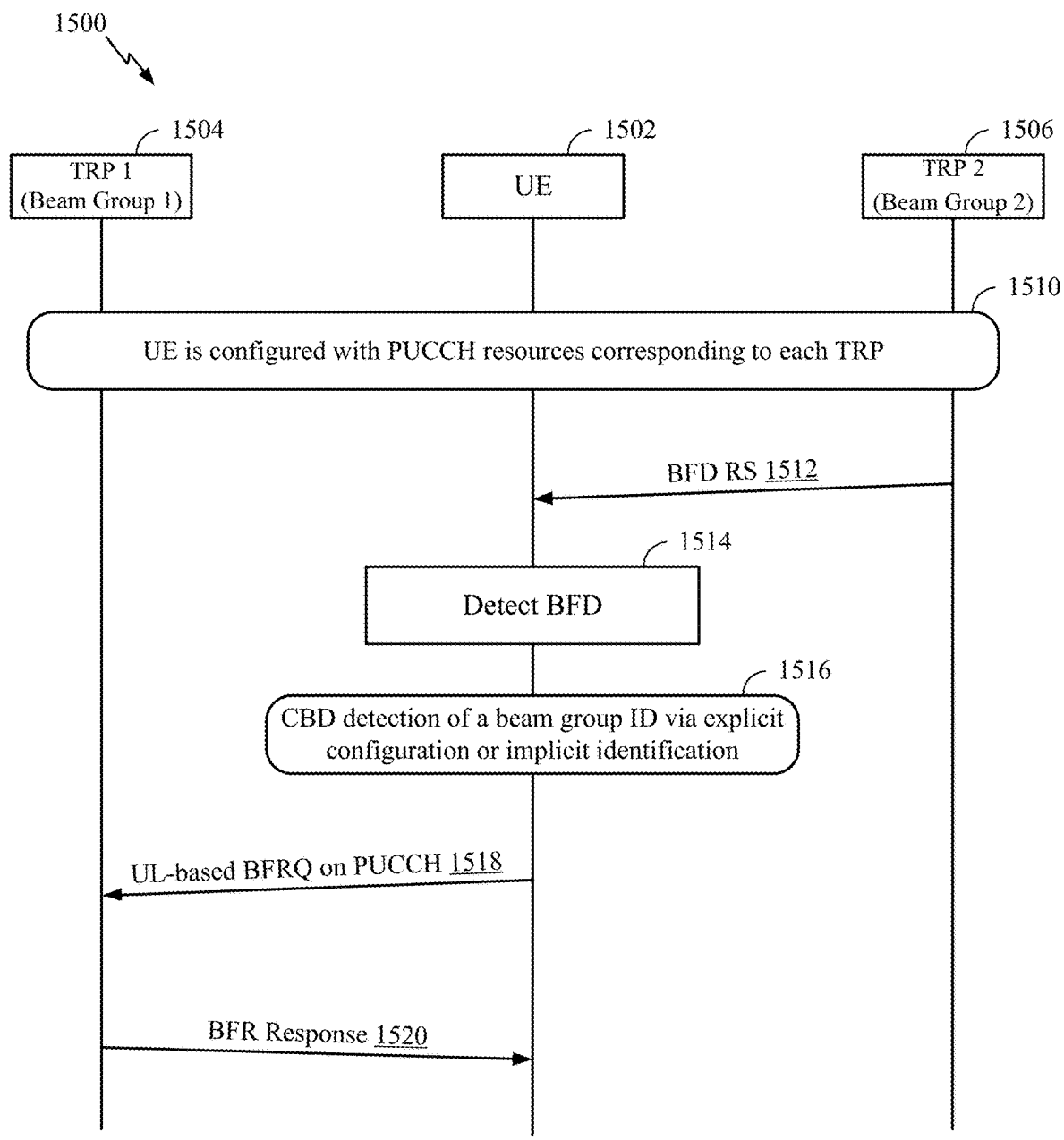
FIG. 15 is a call flow diagram illustrating an example of beam-group-specific uplink control information (UCI)-based beam failure request (BFRQ) using a beam group specific physical uplink control channel (PUCCH) resource, in accordance with certain aspects of the present disclosure.
Figure 16:
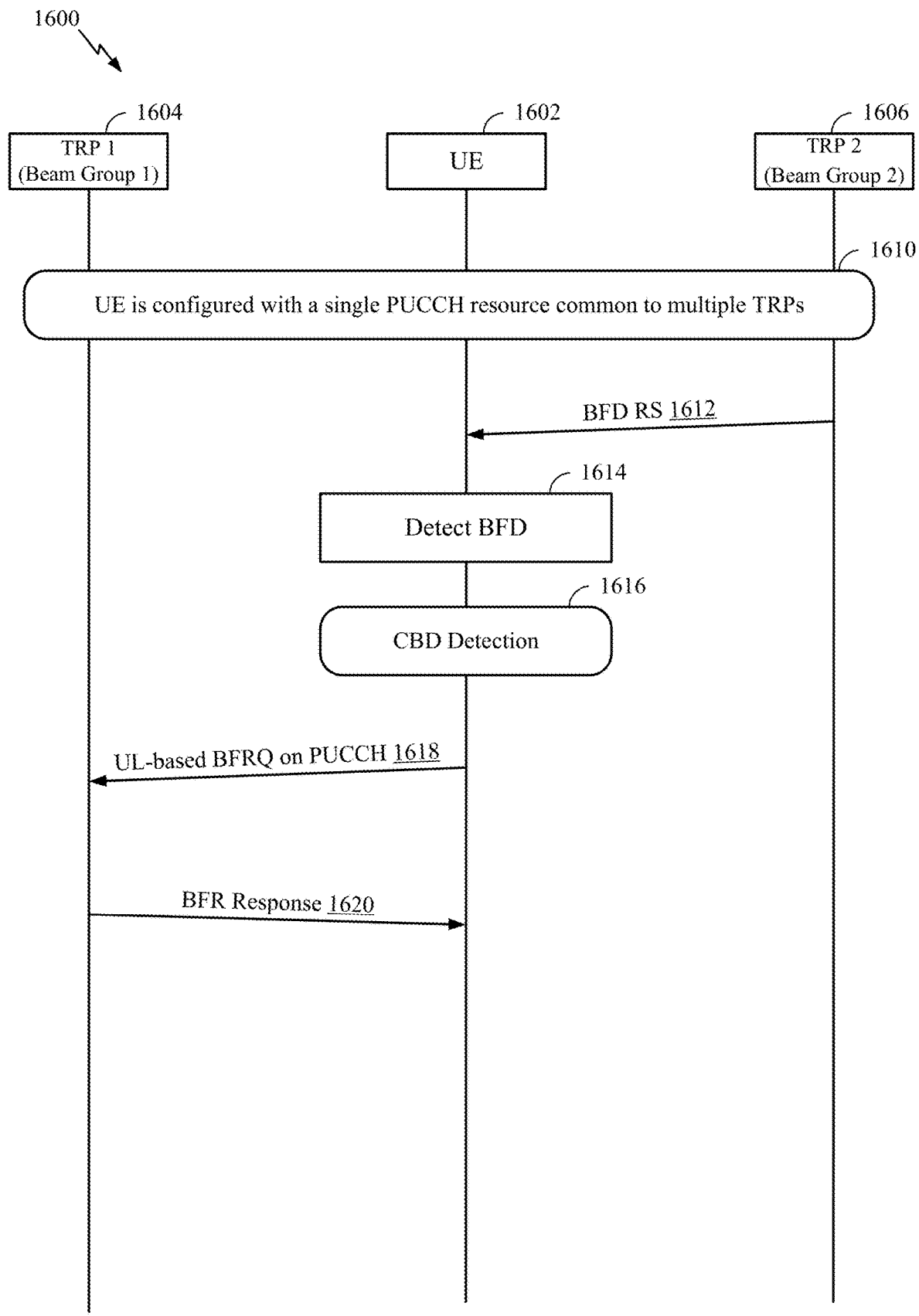
FIG. 16 is a call flow diagram illustrating an example of beam-group-specific UCI using a PUCCH resource common to multiple beam groups, in accordance with aspects of the present disclosure.
Figure 17:
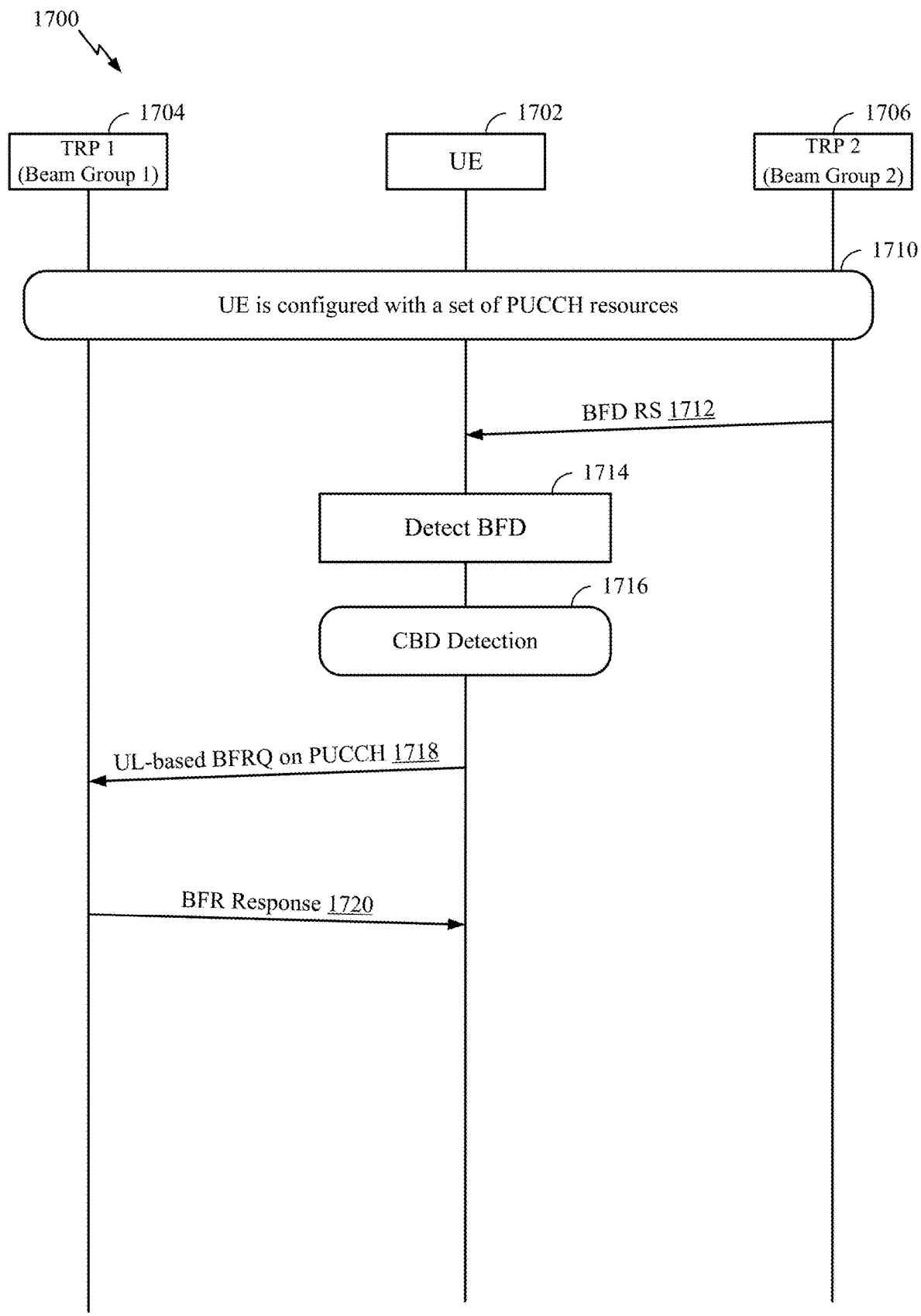
FIG. 17 is a call flow diagram illustrating an example of beam-group-specific UCI using a set of PUCCH resources, in accordance with aspects of the present disclosure.

As illustrated in FIGS. 15, 16, and 17, TRP-specific UCI-based BFRQ transmission may be performed by transmitting a UCI that indicates a BFRQ specific to a beam group in which a beam failure was detected. The UCI may be sent using a physical uplink control channel (PUCCH) resource. More specifically, a new UCI type may be defined for TRP-specific BFR (e.g., TRP recovery request) associated with a PUCCH-Cell corresponding to a specific TRP used in BFR. The PUCCH-Cell may include a special cell (SpCell) and a PUCCH secondary cell (PUCCH-SCell).

As illustrated by example 1500 illustrated in FIG. 15, the UCI may be sent using a TRP specific PUCCH resource (or a beam group specific PUCCH resource). As illustrated, to support transmission of a BFRQ in a UCI transmitted on a TRP-specific PUCCH resource, a UE 1502 may be configured, at block 1510, with the PUCCH resources corresponding to each TRP (including TRP1 1504 and TRP2 1506 illustrated in FIG. 15 and/or other TRPs not illustrated in FIG. 15). Each PUCCH resource may be associated with a different TRP ID. As discussed above, an association between a candidate beam and a TRP ID may be communicated or otherwise made via an explicit configuration (such as in information element 1400 illustrated in FIG. 14) or may be implicit when a TRP ID is associated to a beam group ID by a same beam uniquely used by that TRP specific beam group for downlink transmission. The PUCCH resource may be indicated with an UL beam via RRC/MAC-CE/DCI or a default uplink beam rule.

As illustrated, TRP2 1506 may transmit a BFD RS 1512 to UE 1502, and based on a failure to successfully receive the BFD RS 1512, declare a beam failure at block 1514. Generally, beam failure is declared (e.g., at block 1514), a BFR may be triggered for a failed TRP. In response, the UE may transmit a BFRQ 1518 on the PUCCH. As illustrated, prior to transmitting the BFRQ 1518 on the PUCCH, at block 1516, the UE 1502 can perform candidate beam detection of a beam group ID via an explicit configuration (e.g., information carried in information element 1400 illustrated in FIG. 14) or implicit indication, as discussed above. In some examples, the UE may transmit BFRQ 1518 on the PUCCH using another one or more beam groups associated with the working TRP(s). More specifically, the UE may transmit the PUCCH (and the BFRQ 1518 carried thereon) with UCI indicating an ID of the TRP (or beam group) in which the BFR is triggered and a new candidate beam ID (e.g., an indication of the failed TRP ID and a new candidate beam ID). Subsequently, the network entity (e.g., BS) receiving the UCI-based BFRQ 1518 may identify the failed TRP based on the contents of the UCI sent by the UE. For example, as illustrated, TRP1 1504, which may be the TRP in this example for which a BFD was not detected, may receive the BFRQ 1518 and provide a BFR response 1520 to UE 1502.

In some examples, the UE may transmit the PUCCH resource on all other working beam groups, with defined sequences and associated with the working TRPs, indicating the presence of a PUCCH transmission associated with each TRP. Subsequently, the BS receiving the UCI based BFRQ may identify the failed TRP by detecting the absence of one corresponding PUCCH transmission.

As illustrated by example 1600 of FIG. 16 the UCI may be sent using a PUCCH resource common to multiple beam groups (e.g., a single PUCCH resource).

In some examples, the single PUCCH resource may be configured at block 1610 with a set of candidate UL beams, each explicitly associated with a TRP (e.g., single PUCCH resource with floating UL beams). If the BFR is triggered based on declaration of a beam failure at block 1614 for one TRP (e.g., based on a failure to receive a BFD RS 1612 transmitted by TRP2 1606), the UE may transmit UCI indicating a BFRQ 1618 on the PUCCH with an UL beam of another working TRP. The UCI may indicate an ID of the TRP (or beam group) in which the BFR is triggered and a new candidate beam ID detected at block 1616 (e.g., an indication of the failed TRP ID and a new candidate beam ID). Subsequently, the network entity (e.g., BS) receiving the UCI-based BFRQ 1618 (e.g., TRP1 1604, as illustrated herein) may identify the failed TRP based on the contents of the UCI sent by the UE and transmit a BFR response 1620 to UE 1602.

In some examples, the single PUCCH resource may be configured with multiple repetitions for transmission via multiple uplink beams corresponding to different TRPs (e.g., single PUCCH resource with multiple UL beams). The total bandwidth available in a communication medium may be space division multiplexed (SDMed), frequency division multiplexed (FDMed), or time division multiplexed (TDMed). If the BFR is triggered for one TRP, the UE may transmit the PUCCH repetitions via all configured UL beams and UCI. The UCI may indicate an ID of the TRP (or beam group) in which the BFR is triggered and a new candidate beam ID (e.g., failed TRP ID+new candidate beam ID). Subsequently, the network entity (e.g., BS) receiving the UCI based BFRQ may determine the failed TRP based on the contents of the UCI sent by the UE.

In another example, as illustrated by example 1700 in FIG. 17 the UCI may be sent using a set of PUCCH resources. More specifically, each UE, such as UE 1702, may be configured with a set of PUCCH resources at block 1710. Each PUCCH resource in the set may be associated with its own UL beam, which may be indicated via RRC/MAC-CE/DCI or a default uplink beam rule. The indicated UL beam may correspond to a TRP.

In some examples, if the BFR is triggered for a TRP (or beam group) based on declaration of a beam failure at block 1714 (e.g., based on a failure to receive a BFD RS 1712 from TRP2 1706), the UE 1702 may transmit (e.g., to TRP1

1704), regardless of the TRP ID, the same UCI-based BFRQ 1718 on all PUCCH resources in the set. The UCI may indicate an ID of the TRP (or beam group) in which the BFR is triggered and a new candidate beam ID (e.g., an indication of the failed TRP ID and new candidate beam ID). Subsequently, the network entity (e.g., BS) receiving the UCI-based BFRQ 1718 may determine the failed TRP based on the contents of the UCI sent by the UE and transmit a BFR response 1720 to the UE 1702.

In some examples, each PUCCH resource or PUCCH resource can may be configured for new IE "TRP-BFR-PUCCH-Config" in bandwidth parts uplink dedicated (BWP-UplinkDedicated) in an intended serving cell.

In some aspects, the indication of a beam failure recovery request may be transmitted using RACH-based BFRQ. In RACH-based BFRQ, messages transmitted during a random access (RACH) procedure may carry information indicating a beam failure has occurred and including a beam failure recovery request. As discussed herein, TRP-specific RACH-based BFRQ may be based on a TRP-specific contention free random access (CFRA) configuration or TRP common CFRA configuration. In some cases, the concepts may also be applied to TRP-specific and/or TRP-common contention based random access (CBRA) configurations.

Figure 18:
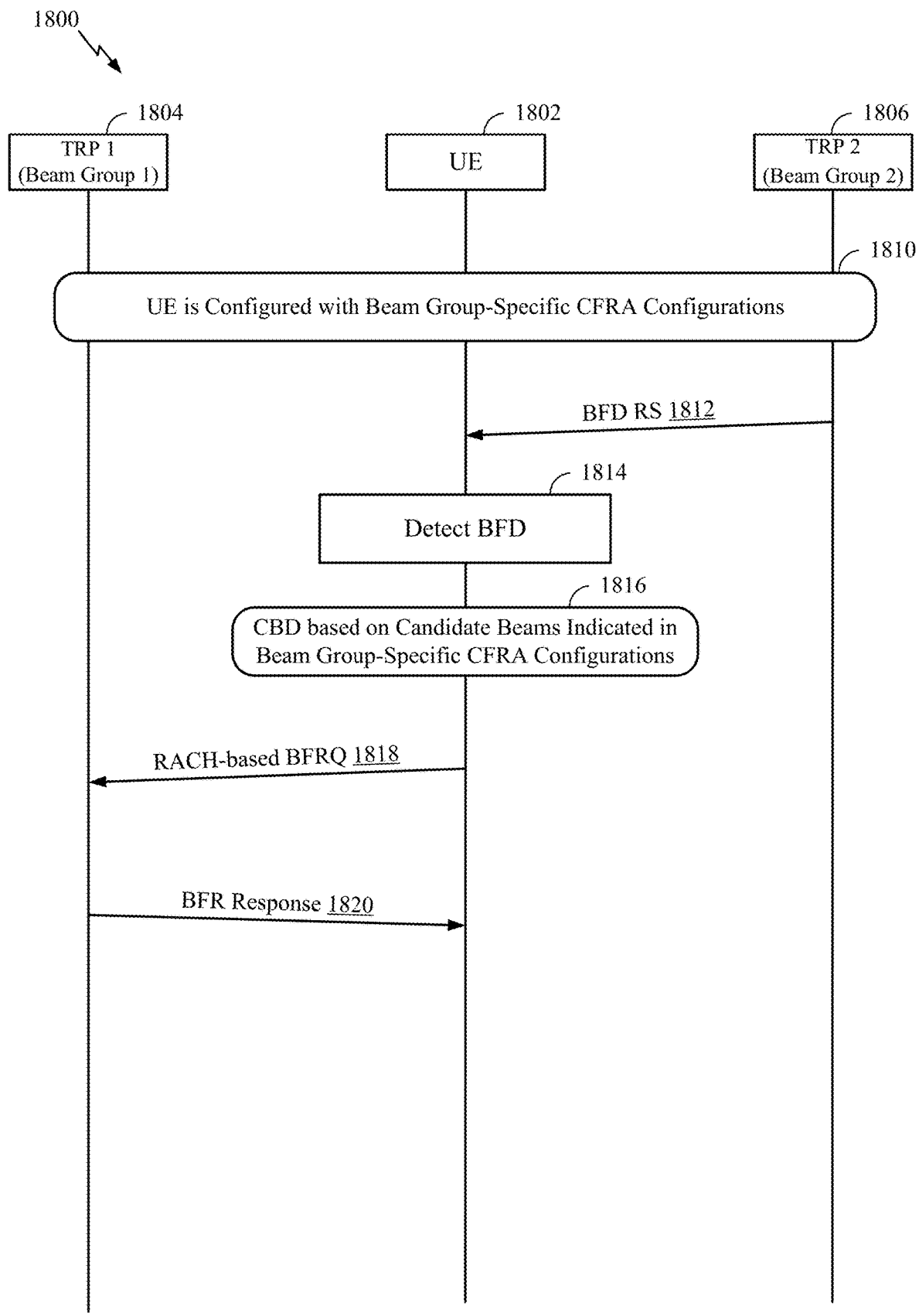
FIG. 18 is a call flow diagram illustrating an example of beam-group-specific random access channel (RACH)-based BFRQ based on a beam group-specific contention free random access (CFRA) configuration, according to aspects of the present disclosure.

As illustrated by example 1800 in FIG. 18, TRP (beam group)-specific RACH-based BFRQ may be performed according to a TRP-specific CFRA configuration specific to the TRP (beam group) on which a beam failure is detected.

A UE 1802 may be configured with TRP-specific CFRA configurations at block 1810. CFRA configurations may be specified on a per-TRP ID basis, and each TRP may have or otherwise be associated with its own CFRA parameters. These CFRA parameters may include one or more of a subset of a CFRA preamble rootSequenceIndex, a list of candidate beams and their corresponding reference signals (RSs), a list of candidate beams and their corresponding parameters, a quality metric threshold (e.g., RSRP) for selecting a candidate beam for CFRA, a beamFailureRecoverytimer, and/or parameters for prioritized preamble transmission (e.g., RA-Prioritization, higher power, and shorter backoff time).

For each beam in the list of candidate beams, per-beam parameters may include a candidate beam RS type (e.g., synchronization signal block (SSB)/channel state information reference signal (CSI-RS)), a ra-PreambleIndex, and/or corresponding ra-OccasionList. Parameter recoverySearchSpaceID provides a search space set for detection of a DCI format that with CRC scrambled by C-RNTI.

If beam failure is declared for a failed TRP (or beam group) at block 1814 (e.g., by a failure to successfully receive a BFD RS 1812 transmitted by TRP2 1806, as illustrated in FIG. 18), a BFR may be triggered, and the UE may perform candidate beam detection (CBD) at block 1816. CBD operations may include measuring corresponding candidate beams in the TRP specific CFRA configuration. For the selected candidate beam, the UE may send the RACH preamble 1818 in one of the corresponding RACH occasions associated with the candidate beam (e.g., ra-OccasionList).

Subsequently, the UE may monitor the PDCCH in a search space set provided by the parameter recoverySearchSpaceID for detection of a DCI format which corresponds to a random access response 1820 (e.g., TRP specific BFR response in this case). The search space may be monitored using a receiving (RX) beam which corresponds to the selected candidate beam.

If CFRA-based TRP-specific BFRQ is not successful after attempting BFRQ for a duration given by the beamFailureRecoverytimer identified in the per-TRP CFRA configurations (e.g., no TRP-specific BFR response is received), the UE may halt the CFRA-based TRP-specific BFRQ and fall back to CBRA-based TRP-specific BFRQ.

Figure 19:
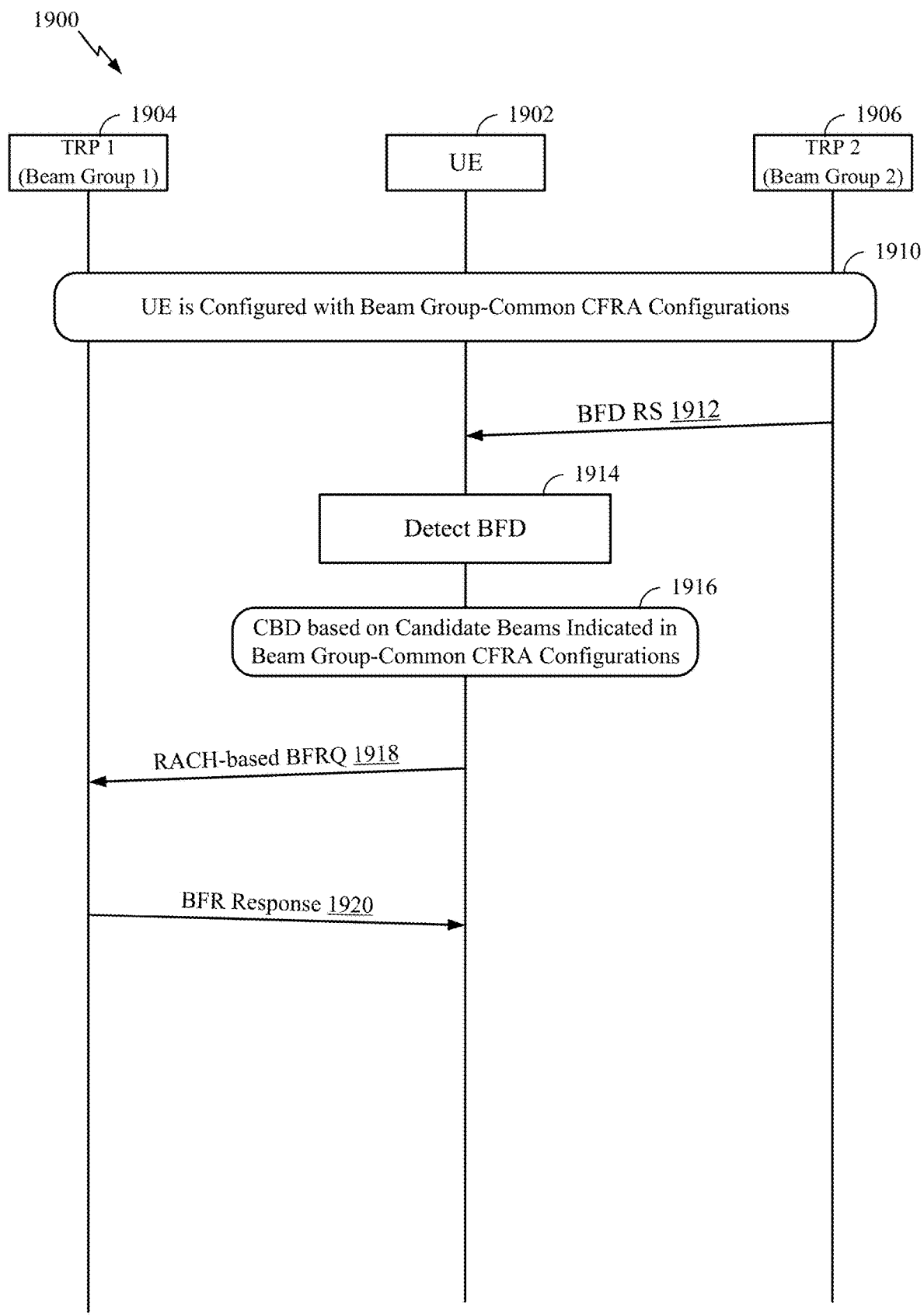
FIG. 19 is a call flow diagram illustrating an example of beam-group-specific RACH-based BFRQ based on a beam group-common CFRA configuration, according to aspects of the present disclosure.

As illustrated in example 1900 of FIG. 19, TRP (beam group)-specific RACH-based BFRQ may be performed according to a TRP-common CFRA configuration shared by multiple TRPs configured for common CFRA, for which the UE may be configured at block 1910. Unlike specific CFRA wherein CFRA configuration may be per TRP ID, common CFRA includes only a single CFRA configuration for CFRA based TRP specific BFRQ.

If a beam failure event is declared at block 1914 (e.g., by a failure to successfully receive a BFD RS 1912 from TRP2 1906, as illustrated in FIG. 19), thus triggering BFR for a failed TRP, the UE may perform candidate beam detection (CBD) at block 1916. CBD operations may include measuring corresponding candidate beams associated with a TRP (e.g., a working TRP). Candidate beams associated with a TRP may be implicitly inferred from the downlink (DL) beam indication used by the candidate beam and exclusively used by the TRP (e.g., based on the QCL uniquely assigned to the PDCCH/PDSCH of a TRP).

For the selected candidate beam, the UE may transmit the RACH preamble 1918 to the TRP associated with the candidate beam. The RACH preamble may be transmitted on one of the corresponding RACH occasions (e.g., ra-OccasionList) configured for the TRP. Subsequently, the UE may monitor the PDCCH in a search space set provided by the parameter recoverySearchSpaceID for detection of a DCI format which corresponds to a random access response 1920 (e.g., TRP specific BFR response in this case). The search space may be monitored using a receiving (RX) beam which corresponds to the selected candidate beam.

In the TRP common CFRA configuration example, the gNB may know which TRP (beam group) failed, based on the selected candidate beam. The gNB may then conduct beam measurement for that failed TRP (beam group).

Figure 20:
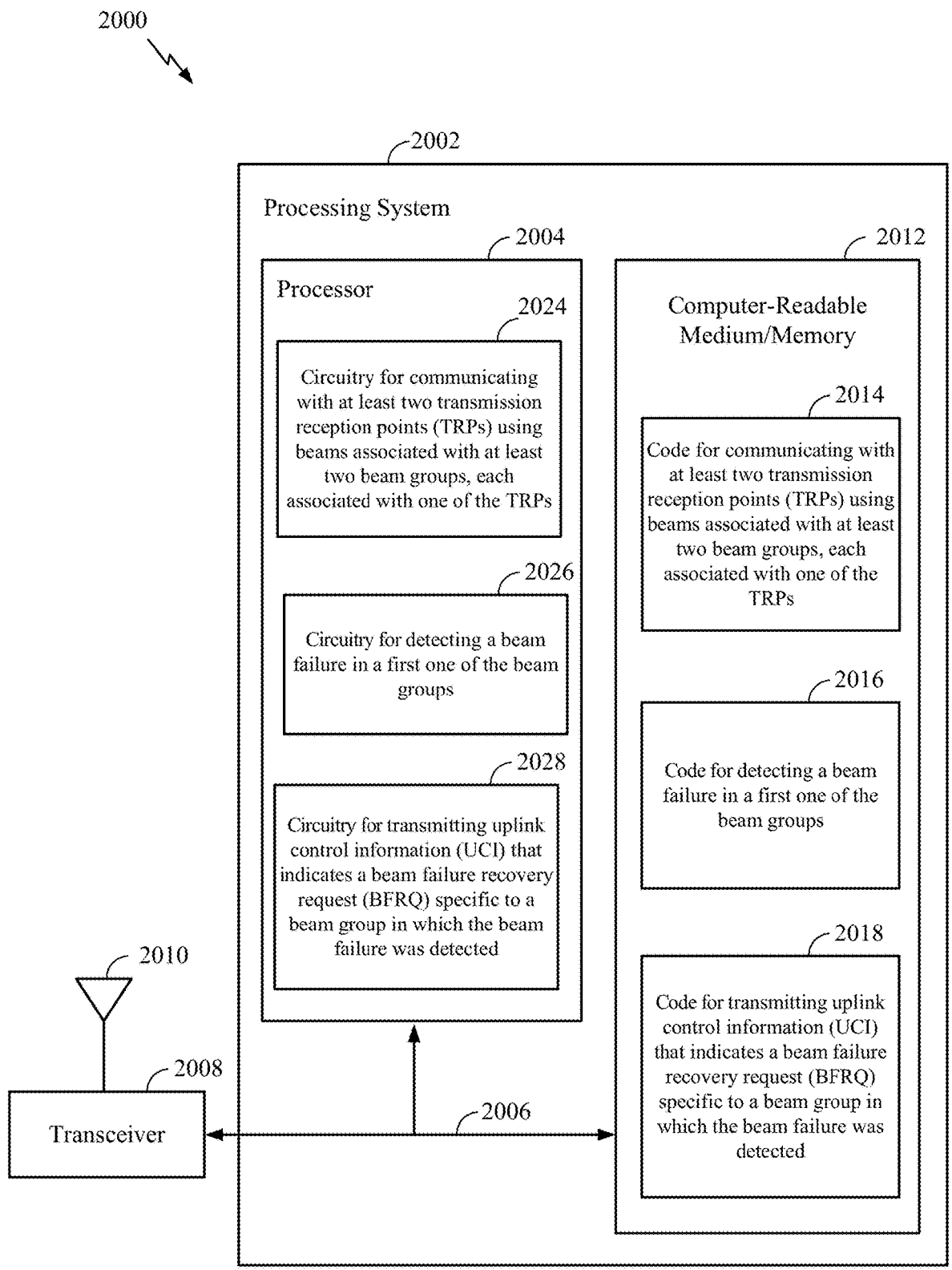
FIG. 20 illustrates a communications device that may include various components configured to perform operations for techniques disclosed herein, according to aspects of the present disclosure.

FIG. 20 illustrates a communications device 2000 that may include various components (e.g., corresponding to means-plus-function components) configured to perform operations for the techniques disclosed herein, such as the operations illustrated in FIG. 12. The communications device 2000 includes a processing system 2002 coupled to a transceiver 2008 (e.g., a transmitter and/or a receiver). The transceiver 2008 is configured to transmit and receive signals for the communications device 2000 via an antenna 2010, such as the various signals as described herein. The processing system 2002 may be configured to perform processing functions for the communications device 2000, including processing signals received and/or to be transmitted by the communications device 2000.

The processing system 2002 includes a processor 2004 coupled to a computer-readable medium/memory 2012 via a bus 2006. In certain aspects, the computer-readable medium/memory 2012 is configured to store instructions (e.g., computer-executable code) that when executed by the processor 2004, cause the processor 2004 to perform the operations illustrated in FIG. 12, or other operations for performing the various techniques discussed herein for TRP-specific BFRQ. In certain aspects, computer-readable medium/memory 2012 stores code 2014 for communicating with at least two TRPs using beams associated with at least two beam groups, each associated with one of the TRPs; and code 2016 for detecting a beam failure in a first one of the beam groups;

code 2018 for transmitting an indication of a BFRQ specific to a beam group in which the beam failure was detected. In certain aspects, the processor 2004 has circuitry configured to implement the code stored in the computer-readable medium/memory 2012. The processor 2004 includes circuitry 2024 for communicating with at least two TRPs using beams associated with at least two beam groups, each associated with one of the TRPs; circuitry 2026 for detecting a beam failure in a first one of the beam groups; and circuitry 2028 for an indication of a BFRQ specific to a beam group in which the beam failure was detected.

Figure 21:
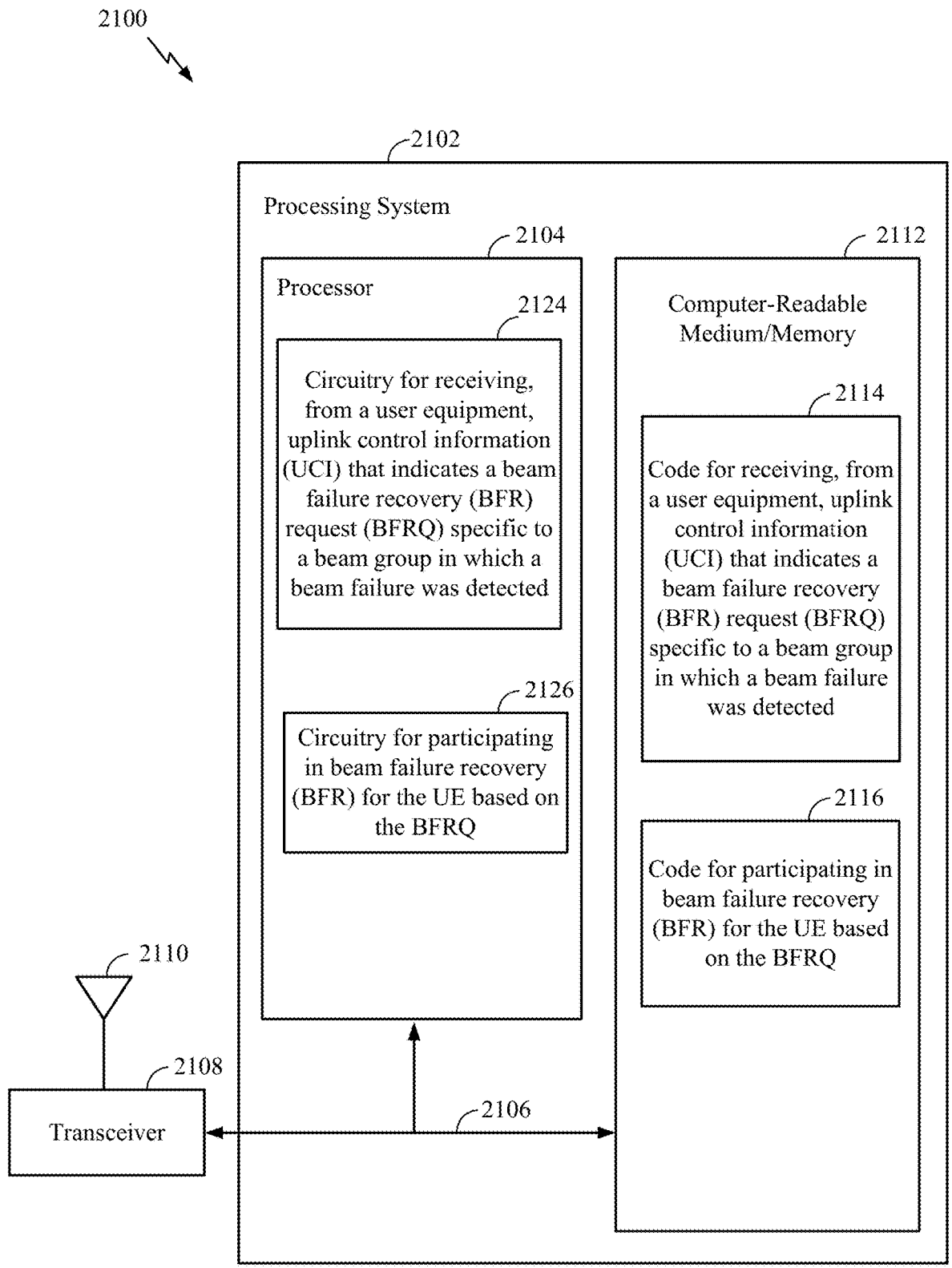
FIG. 21 illustrates a communications device that may include various components configured to perform operations for techniques disclosed herein, according to aspects of the present disclosure.

FIG. 21 illustrates a communications device 2100 that may include various components (e.g., corresponding to means-plus-function components) configured to perform operations for the techniques disclosed herein, such as the operations illustrated in FIG. 13. The communications device 2100 includes a processing system 2102 coupled to a transceiver 2108 (e.g., a transmitter and/or a receiver). The transceiver 2108 is configured to transmit and receive signals for the communications device 2100 via an antenna 2110, such as the various signals as described herein. The processing system 2102 may be configured to perform processing functions for the communications device 2100, including processing signals received and/or to be transmitted by the communications device 2100.

The processing system 2102 includes a processor 2104 coupled to a computer-readable medium/memory 2112 via a bus 2106. In certain aspects, the computer-readable medium/memory 2112 is configured to store instructions (e.g., computer-executable code) that when executed by the processor 2104, cause the processor 2104 to perform the operations illustrated in FIG. 13, or other operations for performing the various techniques discussed herein for TRP-specific BFRQ. In certain aspects, computer-readable medium/memory 2112 stores code 2114 for receiving, from a user equipment, an indication of a beam failure recovery (BFR) request (BFRQ) specific to a beam group in which a beam failure was detected; and code 2116 for participating in beam failure recovery (BFR) for the UE based on the BFRQ. In certain aspects, the processor 2104 has circuitry configured to implement the code stored in the computer-readable medium/memory 2112. The processor 2104 includes circuitry 2124 for receiving, from a user equipment, an indication of a beam failure recovery (BFR) request (BFRQ) specific to a beam group in which a beam failure was detected; and circuitry 2126 for participating in beam failure recovery (BFR) for the UE based on the BFRQ.

Example Aspects

In addition to the various aspects described above, specific combinations of aspects are within the scope of the disclosure, some of which are detailed in the clauses below:

Clause 1: A method of wireless communication by a user equipment (UE), comprising: communicating using beams associated with at least two beam groups; and transmitting, in uplink control information (UCI) on a physical uplink control channel (PUCCH), an indication of a beam failure recovery request (BFRQ) specific to a first beam group of the at least two beam groups associated with a beam failure.

Clause 2: The method of Clause 1, wherein each beam group of the at least two beam groups is associated with one of a plurality of transmission receive points (TRPs).

Clause 3: The method of any one of Clauses 1 or 2, wherein the UCI conforms to a UCI format for beam group specific beam failure recovery (BFR).

Clause 4: The method of Clause 3, wherein the UCI identifies the first beam group for which the BFR is triggered and a new candidate beam ID corresponding to a second beam group for subsequent communications by the UE.

Clause 5: The method of Clause 4, further comprising associating candidate beams to a beam group identifier (ID) or a transmit receive point (TRP) ID.

Clause 6: The method of Clause 5, wherein the association between the candidate beams and the beam group or TRP ID is explicitly indicated via at least one of radio resource control (RRC), medium access control (MAC) control element (CE), or downlink control information (DCI).

Clause 7: The method of any one of Clauses 5 or 6, wherein the association between the candidate beams and the beam group or TRP IDs is implicitly inferred from a downlink beam indication used by a candidate beam and a beam used by a TRP associated with a specific TRP ID.

Clause 8: The method of any one of Clauses 1 through 7, wherein the UCI is transmitted using a beam group-specific PUCCH resource.

Clause 9: The method of Clause 8, wherein: the PUCCH resource is associated with a beam group ID associated with one of the at least two beam groups via explicit configuration; or the PUCCH resource is associated with the beam group ID implicitly by using a same beam uniquely used by a beam group associated with the beam group ID for downlink transmission.

Clause 10: The method of any one of Clauses 8 or 9, wherein the PUCCH resource is indicated with an associated uplink beam via at least one of: radio resource control (RRC), medium access control (MAC) control element (CE), or downlink control information (DCI) signaling; or a default uplink beam rule.

Clause 11: The method of any one of Clauses 8 through 10, wherein: based on the BFR being triggered for the first beam group, the UE transmits the PUCCH using another beam group; and the UCI indicates an ID of the first beam group in which the BFR is triggered and a new candidate beam ID associated with the other beam group.

Clause 12: The method of any one of Clauses 8 through 11, wherein: based on the BFR being triggered for the first beam group, the UE transmits the PUCCH using all other working beam groups of the at least two beam groups with defined sequences indicating presence of a PUCCH transmission associated with each working beam group.

Clause 13: The method of any one of Clauses 1 through 12, wherein the UCI is transmitted using a physical uplink control channel (PUCCH) resource, and wherein the PUCCH resource is used for transmissions using one or more of a plurality of beam groups.

Clause 14: The method of Clause 13, wherein: the UE is configured to transmit the PUCCH using one or more beams from a set of candidate uplink beams, each beam of the one or more beams being associated with one of the plurality of beam groups; based on the BFR being triggered for the first beam group, the UE transmits the PUCCH using an uplink beam of another beam group; and the UCI indicates an ID of the first beam group in which the BFR is triggered and a new candidate beam ID associated with the other beam group.

Clause 15: The method of any one of Clauses 13 or 14, wherein: the UE is configured to transmit the PUCCH using multiple repetitions via multiple uplink beams corresponding to different beam groups; based on the BFR being triggered for the first beam group, the UE transmits the PUCCH repetitions via the multiple uplink beams; and the UCI indicates an ID of the first beam group in which the BFR is triggered and a new candidate beam ID associated with one or more of the multiple uplink beams.

Clause 16: The method of any one of Clauses 1 through 15, wherein: the UE is configured with a set of physical uplink control channel (PUCCH) resources; and each PUCCH resource in the set is associated with a specified uplink beam.

Clause 17: The method of Clause 16, wherein the specified uplink beam for each PUCCH resource of the set of PUCCH resources is indicated via at least one of: radio resource control (RRC), medium access control (MAC) control element (CE), or downlink control information (DCI) signaling; or a default uplink beam rule.

Clause 18: The method of any one of Clauses 16 or 17, wherein: based on the BFR being triggered for the first beam group, the UE transmits same UCI on all PUCCH resources in the set of PUCCH resources; and the UCI indicates an ID of the first beam group in which the BFR is triggered and a new candidate beam ID associated with one or more PUCCH resources of the set of PUCCH resources.

Clause 19: The method of any one of Clauses 16 through 18, wherein each PUCCH resource or the PUCCH resource set is configured via a bandwidth part (BWP) uplink dedicated information element (IE) for an intended serving cell.

Clause 20: A method of wireless communication by a network entity, comprising: receiving, from a user equipment (UE), in uplink control information (UCI) on a physical uplink control channel (PUCCH), an indication of a beam failure recovery request (BFRQ) specific to a beam group in which a beam failure was detected; and participating in beam failure recovery (BFR) for the UE based on the BFRQ.

Clause 21: The method of Clause 20, wherein the beam group is associated with one of a plurality of transmission receive points (TRPs).

Clause 22: The method of Clause 21, wherein the UCI is received on a PUCCH resource, and wherein the PUCCH resource is used for communications using one or more of a plurality of beam groups.

Clause 23: The method of Clause 22, further comprising: configuring the UE to transmit the PUCCH using one or more beams from a set of candidate uplink beams, each beam of the one or more beams being associated with of a plurality of beam groups; and based on the BFR being triggered for the beam group, receiving a PUCCH via an uplink beam of another beam group, wherein the UCI indicates an ID of the beam group in which the BFR is triggered and a new candidate beam ID associated with the other beam group.

Clause 24: The method of any one of Clauses 22 or 23, further comprising: configuring the UE to transmit the PUCCH using multiple PUCCH repetitions for transmission via multiple uplink beams corresponding to different beam groups; and based on the BFR being triggered for the beam group, receiving the PUCCH via the multiple uplink beams, wherein the UCI indicates an ID of the beam group in which the BFR is triggered and a new candidate beam ID associated with one or more of the multiple uplink beams.

Clause 25: An apparatus, comprising: a memory having executable instructions stored thereon; and a processor configured to execute the executable instructions to cause the apparatus to perform the operations of any one of Clauses 1 through 24.

Clause 26: An apparatus, comprising means for performing the operations of any one of Clauses 1 through 24

Clause 27: A computer-readable medium having executable instructions stored thereon which, when executed by a processor, causes the processor to perform the operations of any one of Clauses 1 through 24.

Additional Considerations

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 12 and/or FIG. 13.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of wireless communication by a user equipment (UE), comprising:
communicating using beams associated with at least two beam groups; and
transmitting, in uplink control information (UCI) on a physical uplink control channel (PUCCH), an indication of a beam failure recovery request (BFRQ) specific to a first beam group of the at least two beam groups associated with a beam failure,
wherein:
the UCI is transmitted using a physical uplink control channel (PUCCH) resource,
the PUCCH resource is used for transmissions using one or more of a plurality of beam groups,
the UE is configured to transmit the PUCCH using multiple repetitions via multiple uplink beams corresponding to different beam groups,
based on beam failure recovery (BFR) being triggered for the first beam group, the UE transmits the PUCCH repetitions via the multiple uplink beams, and
the UCI indicates an identifier (ID) of the first beam group in which the BFR is triggered and a new candidate beam ID associated with one or more of the multiple uplink beams.

2. The method of claim 1, wherein each beam group of the at least two beam groups is associated with one of a plurality of transmission receive points (TRPs).

3. The method of claim 1, wherein the UCI conforms to a UCI format for beam group specific BFR.

4. The method of claim 3, wherein the UCI identifies the first beam group for which the BFR is triggered and the new candidate beam ID corresponding to a second beam group for subsequent communications by the UE.

5. The method of claim 4, further comprising associating candidate beams to a beam group ID or a transmit receive point (TRP) ID.

6. The method of claim 5, wherein the association between the candidate beams and the beam group or TRP ID is explicitly indicated via at least one of radio resource control (RRC), medium access control (MAC) control element (CE), or downlink control information (DCI).

7. The method of claim 5, wherein the association between the candidate beams and the beam group or TRP IDs is implicitly inferred from a downlink beam indication used by a candidate beam and a beam used by a TRP associated with a specific TRP ID.

8. The method of claim 1, wherein:
the UE is configured with a set of PUCCH resources; and
each PUCCH resource in the set is associated with a specified uplink beam.

9. The method of claim 8, wherein the specified uplink beam for each PUCCH resource of the set of PUCCH resources is indicated via at least one of:
radio resource control (RRC), medium access control (MAC) control element (CE), or downlink control information (DCI) signaling; or
a default uplink beam rule.

10. The method of claim 8, wherein:
based on the BFR being triggered for the first beam group, the UE transmits same UCI on all PUCCH resources in the set of PUCCH resources; and
the UCI indicates an ID of the first beam group in which the BFR is triggered and the new candidate beam ID associated with one or more PUCCH resources of the set of PUCCH resources.

11. The method of claim 8, wherein each PUCCH resource or the PUCCH resource set is configured via a bandwidth part (BWP) uplink dedicated information element (IE) for an intended serving cell.

12. A method of wireless communication by a network entity, comprising:
receiving, from a user equipment (UE), in uplink control information (UCI) on a physical uplink control channel (PUCCH), an indication of a beam failure recovery request (BFRQ) specific to a beam group in which a beam failure was detected, wherein the UCI is received on a PUCCH resource, and wherein the PUCCH resource is used for communications using one or more of a plurality of beam groups;
participating in beam failure recovery (BFR) for the UE based on the BFRQ;
configuring the UE to transmit the PUCCH using multiple PUCCH repetitions for transmission via multiple uplink beams corresponding to different beam groups; and
based on the BFR being triggered for the beam group, receiving the PUCCH via the multiple uplink beams,
wherein the UCI indicates an identifier (ID) of the beam group in which the BFR is triggered and a new candidate beam ID associated with one or more of the multiple uplink beams.

13. The method of claim 12, wherein the beam group is associated with one of a plurality of transmission receive points (TRPs).

14. The method of claim 12, further comprising:
configuring the UE to transmit the PUCCH using one or more beams from a set of candidate uplink beams, each beam of the one or more beams being associated with a plurality of beam groups; and
based on the BFR being triggered for the beam group, receiving a PUCCH via an uplink beam of another beam group,
wherein the UCI indicates an ID of the beam group in which the BFR is triggered and the new candidate beam ID associated with the other beam group.

15. An apparatus, comprising:
memory having executable instructions stored thereon; and
one or more processors, individually or collectively, configured to execute the executable instructions to cause the apparatus to:
communicate using beams associated with at least two beam groups; and
transmit, in uplink control information (UCI) on a physical uplink control channel (PUCCH), an indication of a beam failure recovery request (BFRQ) specific to a first beam group of the at least two beam groups in which the beam failure was detected,
wherein:
the one or more processors, individually or collectively, are configured to execute the executable instructions to cause the apparatus to transmit the UCI using a PUCCH resource, and wherein the PUCCH resource is used for transmissions using one or more of a plurality of beam groups,
the one or more processors, individually or collectively, are configured to execute the executable instructions to cause the apparatus to transmit the PUCCH using multiple repetitions via multiple uplink beams corresponding to different beam groups;
based on beam failure recovery (BFR) being triggered for the first beam group, the one or more processors, individually or collectively, are configured to execute the executable instructions to cause the apparatus to transmit the PUCCH repetitions via the multiple uplink beams; and
the UCI indicates an identifier (ID) of the first beam group in which the BFR is triggered and a new candidate beam ID associated with one or more of the multiple uplink beams.

16. The apparatus of claim 15, wherein each beam group of the at least two beam groups is associated with one of a plurality of transmission receive points (TRPs).

17. An apparatus, comprising:
memory having executable instructions stored thereon; and
one or more processors configured to execute the executable instructions to cause the apparatus to:
receive, from a user equipment (UE), in uplink control information (UCI) on a physical uplink control channel (PUCCH), an indication of a beam failure recovery request (BFRQ) specific to a beam group in which a beam failure was detected, wherein the UCI is received on a PUCCH resource, and wherein the PUCCH resource is used for communications using one or more of a plurality of beam groups;
participate in beam failure recovery (BFR) for the UE based on the BFRQ;
configure the UE to transmit the PUCCH using multiple PUCCH repetitions for transmission via multiple uplink beams corresponding to different beam groups; and
based on the BFR being triggered for the beam group, receive the PUCCH via the multiple uplink beams,
wherein the UCI indicates an identifier (ID) of the beam group in which the BFR is triggered and a new candidate beam ID associated with one or more of the multiple uplink beams.

* * * * *